(12) United States Patent
Axelbaum et al.

(10) Patent No.: US 10,290,869 B2
(45) Date of Patent: May 14, 2019

(54) DOPED LITHIUM-RICH LAYERED COMPOSITE CATHODE MATERIALS

(71) Applicant: Washington University, St. Louis, MO (US)

(72) Inventors: Richard L. Axelbaum, St. Louis, MO (US); Miklos Lengyel, St. Louis, MO (US)

(*) Notice: Subject to any disclaimer, the term of this patent is extended or adjusted under 35 U.S.C. 154(b) by 540 days.

(21) Appl. No.: 14/664,632

(22) Filed: Mar. 20, 2015

(65) Prior Publication Data

US 2015/0270545 A1  Sep. 24, 2015

Related U.S. Application Data

(60) Provisional application No. 61/968,220, filed on Mar. 20, 2014.

(51) Int. Cl.
| | |
|---|---|
| *H01M 4/525* | (2010.01) |
| *H01M 4/505* | (2010.01) |
| *C01G 53/00* | (2006.01) |
| *H01M 4/02* | (2006.01) |
| *H01M 4/36* | (2006.01) |

(52) U.S. Cl.
CPC ............ *H01M 4/525* (2013.01); *C01G 53/50* (2013.01); *H01M 4/505* (2013.01); *C01P 2002/52* (2013.01); *C01P 2002/72* (2013.01); *C01P 2004/03* (2013.01); *C01P 2004/50* (2013.01); *C01P 2004/61* (2013.01); *C01P 2004/62* (2013.01); *C01P 2004/64* (2013.01); *C01P 2006/12* (2013.01); *C01P 2006/40* (2013.01); *H01M 4/366* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2009/0297947 A1 | 12/2009 | Deng et al. | |
| 2012/0282522 A1 | 11/2012 | Axelbaum et al. | |
| 2013/0280610 A1* | 10/2013 | Hwang | H01M 4/131 429/221 |

OTHER PUBLICATIONS

Dong et al., "Sodium substitution for partial lithium to significantly enhance the cycling stability of Li2MnO3 cathode material", Journal of Power Sources, 2013, pp. 78-87, vol. 243.
Wang et al., "Synthesis of Lithium and Manganese-Rich Cathode Materials via an Oxalate Co-Precipitation Method", Journal of the Electrochemical Society, 2013, pp. A3108-A3112, vol. 160 No. 5.
Thackeray et al., "Li2MnO3-stabilized LiMO2 (M=Mn, Ni, Co) electrodes for lithium-ion batteries", Journal of Materials Chemistry, 2007, pp. 3112-3125, vol. 17.

(Continued)

*Primary Examiner* — Wyatt P McConnell
(74) *Attorney, Agent, or Firm* — Armstrong Teasdale LLP

(57) ABSTRACT

A layered composite composition having a general chemical formula of $Li_{\alpha-x}AD_x(Mn_{\beta-y-\epsilon}Al_yNi_{\gamma-\epsilon}Co_{\delta-z}AED_z)O_2$, wherein AD is an alkaline dopant for Li, AED is an alkaline earth dopant for Co or Ni, and Al is a dopant for Mn or Ni, and at least two of AD, AED, and Al are present in the composition, and the dopants, if present, are at an amount that does not result in the formation of new phase.

37 Claims, 23 Drawing Sheets

(56) References Cited

OTHER PUBLICATIONS

West et al., "Preparation of high quality layered-layered composite Li2MnO3—LiMO2 (M=Ni, Mn, Co) Li-ion cathodes by a ball milling-annealing process", Journal of Power Sources, 2012, pp. 200-204, vol. 204.

Amalraj et al., "Synthesis of Integrated Cathode Materials xLi2MnO3*(1-x)LiMn1/3Ni1/3Co1/3O2 (x=0.3, 0.5, 0.7) and Studies of Their Electrochemical Behavior", Journal of the Electrochemical Society, 2010, pp. A1121-A1130, vol. 157 No. 10.

Hong et al., "Electrochemical properties of 0.3Li2MnO3•0.7LiNi0.5Mn0.5O2 composite cathode powders prepared by large-scale spray pyrolysis", Materials Research Bulletin, 2012, pp. 2022-2026, vol. 47.

Waser et al., "Continuous flame aerosol synthesis of carbon-coated nano-LiFePO4 for Li-ion batteries", Journal of Aerosol Science, 2011, pp. 657-667, vol. 42.

Widiyastuti et al., "Nanoparticle formation in spray pyrolysis under low-pressure conditions", Chemical Engineering Science, 2010, pp. 1846-1854, vol. 65.

Lengyel et al., "Effects of synthesis conditions on the physical and electrochemical properties of Li1.2Mn0.54Ni0.13Co0.13O2 prepared by spray pyrolysis", Journal of Power Sources, 2014, pp. 286-296, vol. 262.

Zhang et al., "Spray Pyrolysis Synthesis of Mesoporous Lithium-Nickel-Manganese-Oxides for High Energy Li-Ion Batteries", Journal of the Electrochemical Society, 2012, pp. A834-A842, vol. 159 No. 6.

Shannon, R.D., "Revised Effective Ionic Radii and Systematic Studies of Interatomic Distances in Halides and Chalcogenides", Acta Crystallographica, 1976, pp. 751-767, vol. A32.

Kim et al., "A comparison of destabilization mechanisms of the layered NaxMO2 and LixMO2 compounds upon alkali de-intercalation", Physical Chemistry Chemical Physics, 2012, pp. 15571-15578, vol. 14.

Sun et al., "AlF3-Coating to Improve High Voltage Cycling Performance of Li[Ni1/3Co1/3Mn1/3]O2 Cathode Materials for Lithium Secondary Batteries", Journal of the Electrochemical Society, 2007, pp. A168-A172, vol. 154 No. 3.

West et al., "Electrochemical Behavior of Layered Solid Solution Li2MnO3—LiMO2 (M=Ni, Mn, Co) Li-Ion Cathodes with and without Alumina Coatings", Journal of the Electrochemical Society, 2011, pp. A883-A889, vol. 158 No. 8.

Amalraj et al., "Studies of Li and Mn-Rich Lix[MnNiCo]O2 Electrodes: Electrochemical Performance, Structure, and the Effect of the Aluminum Fluoride Coating", Journal of the Electrochemical Society, 2013, A2220-A2233, vol. 160 No. 11.

Cabana et al., "Structural and Electrochemical Characterization of Composite Layered-Spinel Electrodes Containing Ni and Mn for Li-Ion Batteries", Journal of the Electrochemical Society, 2009, pp. A730-A736, vol. 156 No. 9.

Pelosato et al., "Co-precipitation in aqueous medium of La0.8Sr0.2Ga0.8Mg0.2O3-δ via inorganic precursors", Journal of Power Sources, 2010, pp. 8116-8123, vol. 195.

Chung et al., "Characteristics of MgO-coated alkaline Earth selenide phosphor prepared by spray pyrolysis", Thin Solid Films, 2013, pp. 98-103, vol. 546.

Conry et al., "Structural Underpinnings of the Enhanced Cycling Stability upon Al Substitution in LiNi0.45Mn0.45Co0.1-yAlyO2 Positive Electrode Materials for Li-ion Batteries", Chemistry of Materials, 2012, pp. 3307-3317, vol. 24.

Conry et al., "XAFS Investigations of LiNi0.45Mn0.45Co0.1-yAlyO2 Positive Electrode Materials", Journal of the Electrochemical Society, 2012, pp. A1562-A1571, vol. 159 No. 9.

Aurbach et al., "Common electroanalytical behavior of Li intercalation processes into graphite and transition metal oxides", Journal of the Electrochemical Society, 1998, pp. 3024-3034, vol. 145 No. 9.

Levi et al., "Solid-state electrochemical kinetics of Li-ion intercalation into Li1-xCoO2: Simultaneous application of electroanalytical techniques SSCV, PITT, and EIS", Journal of the Electrochemical Society, 1999, pp. 1279-1289, vol. 146 No. 4.

Zhuang et al., "An electrochemical impedance spectroscopic study of the electronic and ionic transport properties of LiCoO2 cathode", Chinese Science Bulletin, May 2007, pp. 1187-1195, vol. 52 No. 9.

Zhuang et al., "An Electrochemical Impedance Spectroscopic Study of the Electronic and Ionic Transport Properties of Spinet LiMn2O4", Journal of Physical Chemistry C, 2010, pp. 8614-8621, vol. 114.

Mohanty et al., "Unraveling the Voltage Fade Mechanism in High-Energy-Density Lithium ion Batteries: Origin of the Tetrahedral Cations for Spinel Conversion", Chemistry of Materials, 2014, pp. 6272-6280, vol. 26.

Zheng et al., "Mitigating Voltage Fade in Cathode Materials by Improving the Atomic Level Uniformity of Elemental Distribution", Nano Letters, 2014, pp. 2628-2635, vol. 14.

Deng et al., "Nanostructured Lithium Nickel Manganese Oxides for Lithium-Ion Batteries", Journal of the Electrochemical Society, 2010, pp. A447-A452, vol. 157 No. 4.

Verde et al., "Effect of Morphology and Manganese Valence on the Voltage Fade and Capacity Retention of Li [Li2/12Ni3/12Mn7/12]O2", ACS Applied Material Interfaces, 2014, pp. 18868-18877, vol. 6 No. 21.

Idemoto et al., "Li Content Dependence of Thermodynamic Stability and the Crystal Structure of LixMn1-yMyO2 (M=Mn,Al,Cu) as a Cathode Active Material for Li Secondary Battery", Electrochemistry, 2005, pp. 823-829, vol. 73 No. 9.

Julien et al., "Optimization of Layered Cathode Materials for Lithium-Ion Batteries", Materials, 2016, vol. 9, 595, pp. 1-26.

Lengyel et al., "Trace Level Doping of Lithium-Rich Cathode Materials", Journal of Materials Chemistry A, 2016, vol. 4, pp. 3538-3545.

Erickson et al., "Review—Recent Advances and Remaining Challenges for Lithium Ion Battery Cathodes", Journal of the Electrochemical Society, 2017, pp. A6341-A6348, vol. 164(1).

Kim et al, "Electrochemical and Structural Properties of xLi2M'O3•(1-x)LiMx0.5Ni0.5O2 Electrodes for Lithium Batteries (M'=Ti, Mn, Zr; 0 x 0.3)", Chemistry of Materials, 2004, pp. 1996-2006, vol. 16 No. 10.

Johnson et al., "Anomalous capacity and cycling stability of xLi2MnO3*(1-x)LiMO2 electrodes (M=Mn, Ni, Co) in lithium batteries at 50° C.", Electrochemistry Communications, 2007, pp. 787-795, vol. 9.

Johnson et al., Synthesis, Characterization and Electrochemistry of Lithium Battery Electrodes: xLi2MnO3*(1-x) LiMn0.333Ni0.333Co0.333O2 (0≤x≤0.7), Chemistry of Materials, 2008, pp. 6095-6106, vol. 20.

McCalla et al., "The Role of Metal Site Vacancies in Promoting Li—Mn—Mi—O Layered Solid Solutions", Chemistry of Materials, 2013, pp. 2716-2721, vol. 25.

Yabuuchi et al., "Detailed Studies of a High-Capacity Electrode Material for Rechargeable Batteries, Li2MnO3—LiCo1/3Ni1/3Mn1/3O2", Journal of the American Chemical Society, 2011, pp. 4404-4419, vol. 133.

Gu et al., "Formation of the Spinel Phase in the Layered Composition Cathode Used in Li-Ion Batteries", ACS Nano, 2013, pp. 760-767, vol. 7 No. 1.

Liu et al., "General synthesis of xLi2MnO3(1-x)LiMn1/3Ni1/3Co1/3O2 nanomaterials by a molten-salt method: towards a high capacity and high power cathode for rechargeable lithium batteries", Journal of Materials Chemistry, 2012, pp. 25380-25387, vol. 22.

Fell et al., "Synthesis-Structure-Property Relations in Layered, "Li-excess" Oxides Electrode Materials Li[Li1/3-2x/3NixMn2/3-x/3]O2 (x=113, 1/4, and 1/5)", Journal of the Electrochemical Society, 2010, pp. A1202-A1211, vol. 157.

Cabana et al., "Structual complexity of layered-spinel composite electrodes for Li-ion batteries", Journal of Materials Research, Aug. 2010, pp. 1601-1616, vol. 25 No. 8.

Wu et al., "High Capacity, Surface-Modified Layered (Li[Li(1-x)/3Mn(2-x)/3Nix/3Cox/3]O2 cathodes with Low Irreversible Capacity Loss", Electrochemical and Solid-State Letters, 2006, A221-A224, vol. 9 No. 5.

(56) References Cited

OTHER PUBLICATIONS

Gao et al., "Eliminating the irreversible capacity loss of high capacity layered Li[Li0.2Mn0.54Ni0.13Co0.13]O2 cathode by blending with other lithium insertion hosts", Journal of Power Sources, 2009, pp. 644-647, vol. 191.

Manthiram, Arumugam, "Materials Challenges and Opportunities of Lithium Ion Batteries", The Journal of Physical Chemistry Letters, 2011, pp. 176-184, vol. 2.

Yu et al., "High-energy 'composite' layered manganese-rich cathode materials via controlling Li2MnO3 phase activation for lithium-ion batteries", Physical Chemistry Chemical Physics, 2012, pp. 6584-6595, vol. 14.

Hong et al., "Critical Role of Oxygen Evolved from Layered Li-Excess Metal Oxides in Lithium Rechargeable Batteries", Chemistry of Materials, 2012, pp. 2692-2697, vol. 24.

Ghanty et al., "Electrochemical performances of 0.9Li2MnO3-0.1Li(Mn0.375Ni0.375Co0.25)O2 cathodes Role of the cycling induced layered to spinel phase transformation", Solid State Ionics, 2014, pp. 19-28, vol. 256.

Wang et al., "Relationships between Structural Changes and Electrochemical Kinetics of Li-Excess Li1.13Ni0.3Mn0.57O2 during the First Charge", The Journal of Physical Chemistry, 2013, pp. 3279-3286, vol. 117.

Simonin et al., "In situ investigations of a Li-rich Mn—Ni layered oxide for Li-ion batteries", Journal of Materials Chemistry, 2012, pp. 11316-11322, vol. 22.

Croy et al., "Examining Hysteresis in Composite xLi2MnO3•(1-x)LiMO2 Cathode Structures", The Journal of Physical Chemistry, 2013, pp. 6525-6536, vol. 117.

Mohanty et al., "Structural transformation of a lithium-rich Li1.2Co0.1Mn0.55Ni0.15O2 cathode during high voltage cycling resolved by in situ X-ray diffraction", Journal of Power Sources, 2013, pp. 239-248, vol. 229.

Mohanty et al., "Structural transformation in a Li1.2Co0.1Mn0.55Ni0.15O2 lithium-ion battery cathode during high-voltage hold", RSC Advances, 2013, pp. 7479-7485, vol. 3.

Mohanty et al., "Correlating cation ordering and voltage fade in a lithium-manganese-rich lithium-ion battery cathode oxide: a joint magnetic susceptibility and TEM study", Physical Chemistry Chemical Physics, 2013, pp. 19496-19509, vol. 15.

Mohanty et al., "Neutron Diffraction and Magnetic Susceptibility Studies on a High-Voltage Li1.2Mn0.55Ni0.15Co0.10O2 Lithium Ion Battery Cathode: Insight into the Crystal Structure", Chemistry of Materials, 2013, pp. 4064-4070, vol. 25.

Gu et al., "Nanoscale Phase Separation, Cation Ordering, and Surface Chemistry in Pristine Li1.2Ni0.2Mn0.6O2 for Li-Ion Batteries", Chemistry of Materials, 2013, pp. 2319-2326, vol. 25.

Li et al., "Understanding Long-Term Cycling Performance of Li1.2Ni0.15Mn0.55Co0.1O2—Graphite Lithium-Ion Cells", Journal of the Electrochemical Society, 2013, pp. A3006-A3019, vol. 160 No. 5.

Yu et al., "Continuous activation of Li2MnO3 component upon cycling in Li1.167Ni0.233Co0.100Mn0.467Mo0.033O2 cathode material for lithium ion batteries", Journal of Materials Chemistry A, 2013, pp. 2833-2839, vol. 1.

Bloom et al., "Effect of interface modifications on voltage fade in 0.5Li2MnO3 0.5LiNi0.375Mn0.375Co0.25O2 cathode materials", Journal of Power Sources, 2014, pp. 509-214, vol. 249.

Sathiya et al, "Reversible anionic redox chemistry in high-capacity layered-oxide electrodes", Nature Materials, Sep. 2013, pp. 827-835, vol. 12.

Lee et al., "Smart design of lithium-rich layered oxide cathode compositions with suppressed voltage decay", Journal of Materials Chemistry A, 2014, pp. 3932-3939, vol. 2.

Lengyel et al., "Composition Optimization of Layered Lithium Nickel Manganese Cobalt Oxide Materials Synthesized via Ultrasonic Spray Pyrolysis", Journal of the Electrochemical Society, 2014, A1-Al2, vol. 161 No. 9.

Zhang et al., "Nanostructured High-Energy xLi2MnO3•(1-x)LiNi0.5Mn0.5O2 (0.3 ≤ x ≤ 0.6) Cathode Materials", AIChE Journal, Feb. 2014, pp. 443-450, vol. 60 No. 2.

Lengyel et al., "Effects of surface area and lithium content on the electrochemical performance of Li1.2Mn0.54Ni0.13Co0.13O2", Journal of the Electrochemical Society, 2014, A1023-A1031, vol. 161 No. 6.

Son et al., "Effects of ratios of Li2MnO3 and Li(Ni13Mn13Co13)O2 phases on the properties of composite cathode powders in spray pyrolysis", Electrochimica Acta, 2013, pp. 110-118, vol. 103.

Liu et al., "Degradation and Structural Evolution of xLi2MnO3 • (1-x)LiMn1/3Ni1/3Co1/3O2 during Cycling", Journal of the Electrochemical Society, 2014, pp. A160-A167, vol. 161 No. 1.

Wang et al., "High-Rate Performances of the Ru-Doped Spinel LiNi0.5Mn1.5O4:Effects of Doping and Particle Size", The Journal of Physical Chemistry, 2011, pp. 6102-6110, vol. 115.

Luo et al., "Synthesis, Characterization and Thermal Stability of LiNi1/3Mn1/3Co1/3-zMgzO2, LiNi1/3-zMn1/3Co1/3MgzO2 and LiNi1/3Mn1/3-zCo1/3-zMgzO2", Chemistry of Materials, 2010, pp. 1164-1172, vol. 22.

Pouillerie et al., "Effect of Magnesium substitution on the cycling behavior of lithium nickel cobalt oxide", Journal of Power Sources, 2001, pp. 293-302, vol. 96.

Chowdari et al., "Cathodic behavior of (Co, Ti, Mg)—doped LiNiO2", Solid State Ionics, 2001, pp. 55-62, vol. 140.

Lee et al., "Suppression of Phase Transition in LiTb0.01Mn1.99O4 Cathodes with Fast Li+Diffusion", ACS Applied Materials & Interfaces, 2012, pp. 6842-6848, vol. 4.

Tavakoli et al., "Stabilizing Effect of Mg on the Energetics of the Li(Ni,Co,Al)O2 Cathode Material for Lithium Ion Batteries", Journal of the Electrochemical Society, 2013, pp. A302-A305, vol. 160 No. 2.

Zhou et al., "Synthesis, structure and electrochemistry of Ag-modified LiMn2O4 cathode materials for lithium-ion batteries", Materials Research Bulletin, 2008, pp. 2285-2294, vol. 43.

Johnson et al., "The role of Li2M02 structures (M=metal ion) in the electrochemistry of (x)LiMn0.5Ni0.5O2 (1-x) Li2TiO3 electrodes for lithium-ion batteries", Electrochemistry Communications, 2002, pp. 492-498, vol. 4.

Park et al., "Effects of Molybdenum Doping on the Layered Li[Ni0.5+xMn0.5-2xMox]O2 Cathode Materials for Lithium Secondary Batteries", Chemistry Letters, 2004, pp. 2-3, vol. 33 No. 1.

Idemoto et al., "Li content dependence of crystal structure and electronic structure for chemical delithiation of LixMn2-yMyO4 (M=Mg, Al, Cr, Mn, Co, Zn, Ni) as a Cathode Active Material for Li Secondary Battery", Electrochemistry, 2004, pp. 755-762, vol. 72 No. 11.

Yabuuchi et al., "Structural and Electrochemical Characterizations on Li2MnO3—LiCoO2—LiCrO2 System as Positive Electrode Materials for Rechargeable Lithium Batteries", Journal of the Electrochemical Society, 2013, pp. A39-A45, vol. 160 No. 1.

Song et al., "Influence of Ru substitution on Li-rich 0.55Li2MnO3 0.45LiNi1/3Co1/3Mn1/3O2 cathode for Li-ion batteries", Electrochimica Acta, 2012, pp. 187-195, vol. 80.

Wang et al., "Influence of cationic substitutions on the first charge and reversible capacities of lithium-rich layered oxide cathodes", Journal of Materials Chemistry A, 2013, pp. 10209-10217, vol. 1.

Yu et al., "Initial Coulombic efficiency improvement of the Li1.2Mn0.567Ni0.166Co0.067O2 lithium-rich material by ruthenium substitution for manganese", Journal of Materials Chemistry, 2012, pp. 15507-15510, vol. 22.

Qiu et al., "Effects of Na+ contents on electrochemical properties of Li1.2Ni0.13Co0.13Mn0.54O2 cathode materials", Journal of Power Sources, 2013, pp. 530-535, vol. 240.

Tang et al., "Effects of Al doping for Li[Li0.09Mn0.65*0.91Ni0.35*0.91]O2 cathode material", Ionics, 2013, pp. 1495-1501, vol. 19.

He et al., "Enhanced high-rate capability and cycling stability of Na-stabilized layered Li1.2[Co0.13Ni0.13Mn0.54]O2 cathode material", Journal of Materials Chemistry A, 2013, pp. 11397-11403, vol. 1.

* cited by examiner

Figure 13
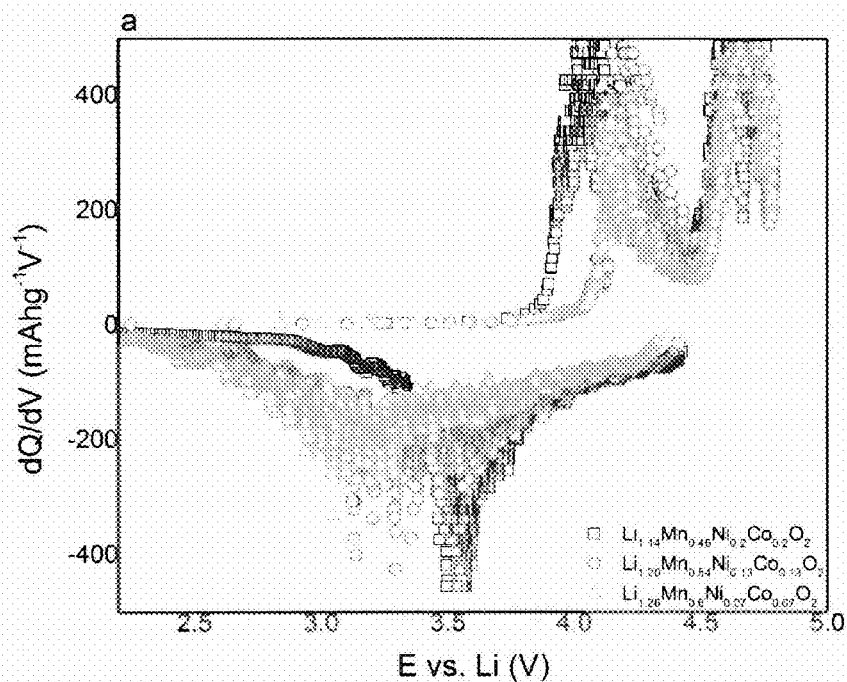
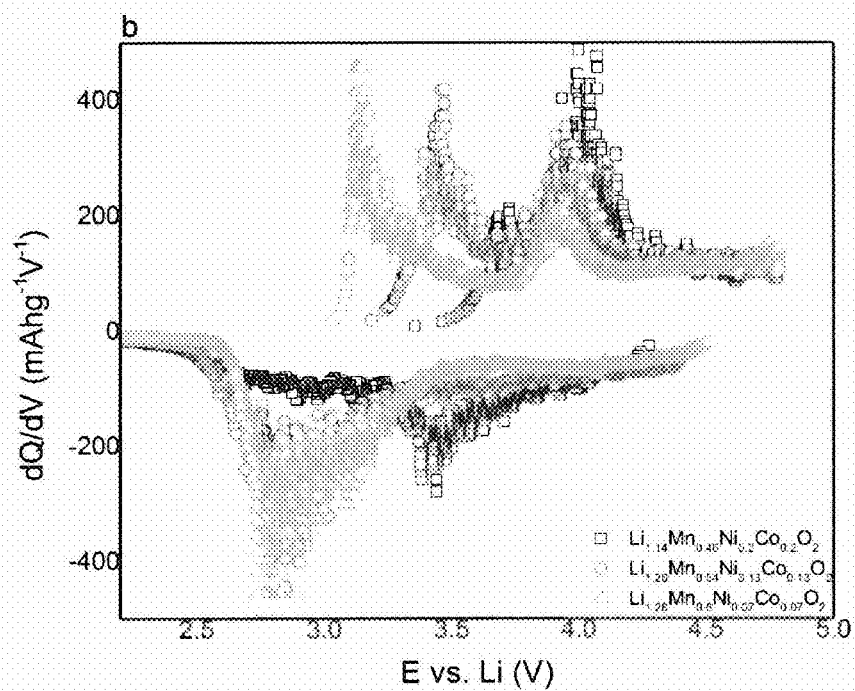

DOPED LITHIUM-RICH LAYERED COMPOSITE CATHODE MATERIALS

CROSS-REFERENCE TO RELATED APPLICATIONS

This application claims the benefit of U.S. Provisional Application Ser. No. 61/968,220, filed Mar. 20, 2014, which is incorporated herein by reference in its entirety.

STATEMENT REGARDING FEDERALLY SPONSORED RESEARCH OR DEVELOPMENT

This invention was made with Government Support under a grant from the National Science Foundation (Grant No. 0928964). The government has certain rights to this invention.

FIELD OF THE INVENTION

Cathode Materials for lithium ion batteries. More specifically, layered composite compositions based on $xLi_2MnO_3 \cdot (1-x)Li(NiMnCo)O_2$.

BACKGROUND OF INVENTION

Lithium ion batteries revolutionized portable electronics and have the potential to electrify the transportation sector. Layered cathode materials with the composition $xLi_2MnO_3 \cdot (1-x)Li(Ni_{1/3}Mn_{1/3}Co_{1/3})O_2$ have received significant attention as candidates for PHEVs and EVs. The cathodes display high capacities (>200 mAhg-1) and good cycling stability, offering twice the energy density of currently available intercalation materials. Unfortunately, they undergo voltage fade due to a layered-spinel phase transformation, which leads to an overall loss of energy from the battery and challenges to the Battery Management System. A solution to the problem has thus far been elusive. Spray pyrolysis allows for accurate control of material chemistry to trace levels. The one-droplet to one-particle conversion mechanism also ensures that compositional non-uniformities do not exist between particles. In the current study spray pyrolysis is applied to produce layered battery materials with various dopants. It is demonstrated for the first time that by selectively doping NMC cathodes by a combination of inexpensive trace level alkali, alkaline earth and Al dopants the voltage fade of the materials is reduced without compromising electrochemical performance.

SUMMARY OF INVENTION

In one embodiment, the present invention is directed to a layered composite composition having a general chemical formula of $Li_{\alpha-x}AD_x(Mn_{\beta-y-\varepsilon}Al_yNi_{\gamma-\varepsilon}Co_{\delta-z}AED_z)O_2$ wherein:
  AD is an alkaline dopant selected from the group consisting of Na, K, Rb, Cs, and combinations thereof;
  AED is an alkaline earth dopant selected from the group consisting of Mg, Ca, Sr, Ba, and combinations thereof;
  $1 \leq \alpha \leq 2$;
  $0 \leq x <$ an alkaline dopant threshold concentration at and above which an alkaline-containing spinel phase is formed in the composition;
  $1/3 \leq \beta \leq 1$;
  $0 \leq y < 0.1$;
  $0.0 \leq \gamma \leq 1/3$;
  $0.0 \leq \delta \leq 1/3$;
  $0 \leq z$, $\varepsilon \leq$ an alkaline earth threshold concentration at and above which an alkaline earth-containing spinel phase is formed in the composition; and
  at least two of x, y, z, and $\varepsilon$ are $\geq 0.001$ In another embodiment, the present invention is directed to a metal oxide material comprising a plurality of mesoporous metal oxide secondary particles that comprise metal oxide primary particles, wherein the primary particles have a size that is in a range of about 1 nm to about 10 μm and the secondary particles have a size that is in a range of about 10 nm to about 100 μm, and wherein the metal oxide is the foregoing layered composite composition.

In yet another embodiment, the present invention is directed to a process for preparing the foregoing metal oxide material, the process comprising aerosolizing a precursor solution that comprises compounds that are precursors to the metal oxide in a solvent to form droplets that comprise the precursor solution; evaporating the solution in the droplets to form dried droplets that comprise the precursor compounds; calcining the dried droplets to form the metal oxide material that comprises a plurality of metal oxide secondary particles that comprise metal oxide primary particles.

In still another embodiment, the present invention is directed to a metal oxide-containing material comprising a plurality of mesoporous, metal oxide-containing secondary particles with a non-hollow morphology and a mean size that is in a range of about 1 μm to about 15 μm, wherein the secondary particles comprise primary particles with a mean size that is in a range of about 50 nm to about 500 nm, and wherein the metal oxide is the foregoing layered composite composition.

In a further embodiment, the present invention is directed to a process for preparing the foregoing metal oxide-containing material, the process comprising conducting spray pyrolysis that comprises:
  aerosolizing a slurry that comprises solid-phase particles in a precursor solution to form droplets that comprise the precursor solution and one or more of the solid-phase particles, wherein (i) the solid-phase particles have a mean size that is in a range of about 10 nm and 50 μm, and (ii) the precursor solution comprises precursor compounds to the metal oxide that are dissolved in a solvent, and (iii) the slurry has a total mass fraction of solid-phase particles to metal oxide-containing material that is in a range of about 2% to about 75%;
  evaporating the solvent in the droplets to form dried droplets that comprise the precursor compounds and one or more solid-phase particles; and
  calcining the dried droplets to at least partially decompose the precursor compounds and form the metal oxide-containing material, wherein the metal oxide-containing material comprises product particles that comprise the metal oxide, wherein the product particles have (i) a mean size that is in a range of about 100 nm to about 500 μm and (ii) a mean hollowness, which is less than a mean hollowness of particles of about the same mean size prepared by an otherwise identical spray pyrolysis process conducted except for the absence of seed particles in the aerosol; and
wherein the metal oxide is the foregoing layered composite composition.

BRIEF DESCRIPTION OF THE DRAWINGS

FIG. 13: dQ/dV curves of $Li_{1.14}Mn_{0.46}Ni_{0.2}Co_{0.2}O_2$, $Li_{1.2}Mn_{0.54}Ni_{0.13}Co_{0.13}O_2$ and $Li_{1.26}Mn_{0.6}Ni_{0.07}Co_{0.07}O_2$ for (a) cycle 1 and (b) cycle 50.

between 2.0-4.8 V. The curves are organized according to the position of the dopant element in the periodic table and above each curve the dopant is included. All dopant levels in the current table are fixed at 0.01.

Figure 23:
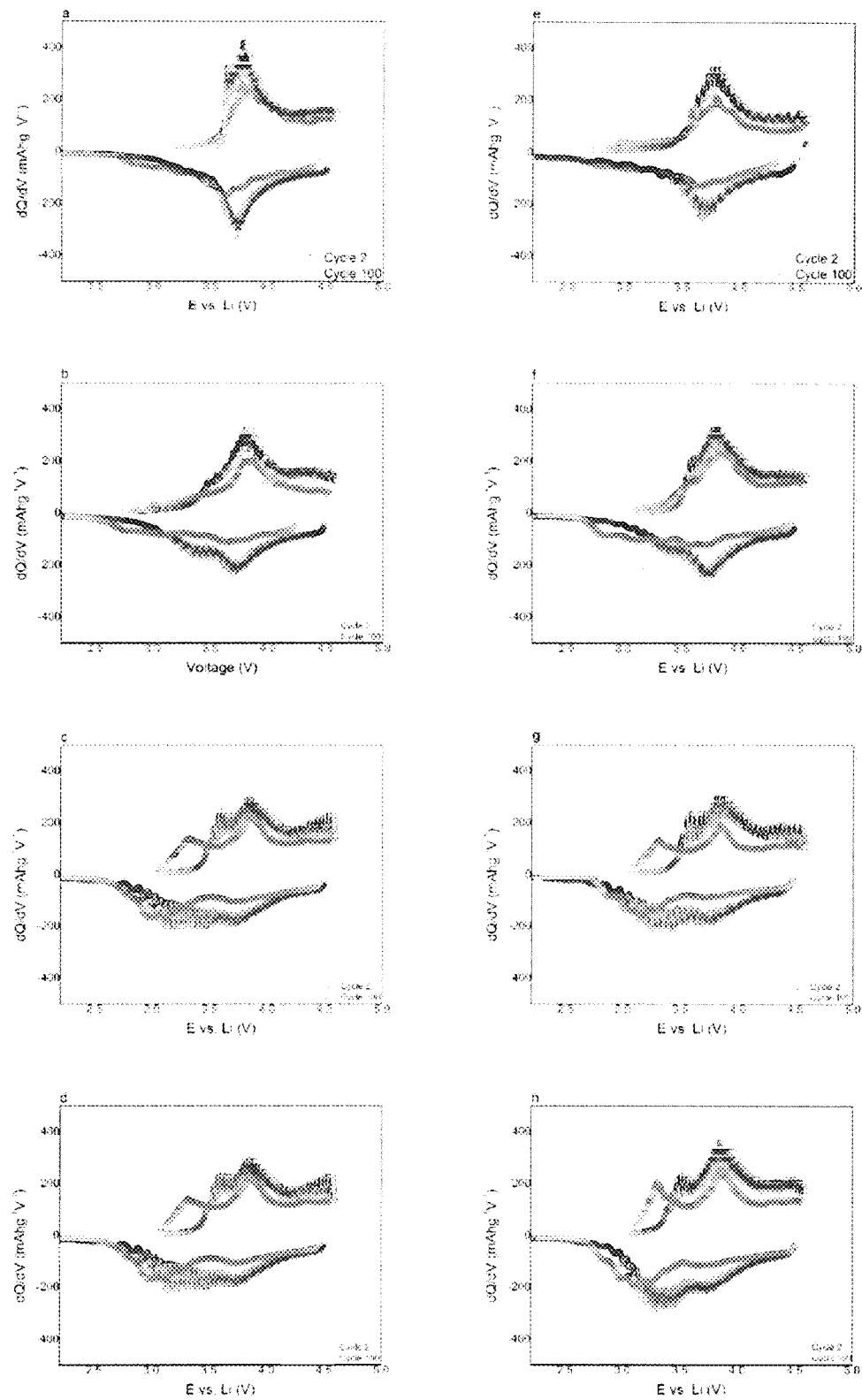

FIG. 23: dQ/dV curves of cycle 2 and cycle 100 of the following:

(a) $Li_{1.09}Mn_{0.43}Ni_{0.24}Co_{0.24}O_2$ (850° C.);
(b) $Li_{1.14}Mn_{0.46}Ni_{0.2}Co_{0.2}O_2$ (850° C.);
(c) $Li_{1.2}Mn_{0.54}Ni_{0.13}Co_{0.13}O_2$ (900° C.);
(d) $Li_{1.2}Mn_{0.54}Ni_{0.13}Co_{0.13}O_2$ (900° C.);
(e) $Li_{1.08}Na_{0.01}Mn_{0.42}Al_{0.01}Ni_{0.24}Co_{0.23}Ba_{0.01}O_2$ (800° C.);
(f) $Li_{1.13}Na_{0.01}Mn_{0.45}Al_{0.01}Ni_{0.2}Co_{0.19}Ba_{0.01}O_2$ (800° C.);
(g) $Li_{1.197}Na_{0.003}Mn_{0.541}Al_{0.003}Ni_{0.13}Co_{0.12}Ba_{0.003}O_2$ (900° C.); and
(h) $Li_{1.197}Na_{0.003}Mn_{0.541}Al_{0.003}Ni_{0.13}Co_{0.12}Mg_{0.003}O_2$ (900° C.).

The temperatures after the compositions indicate the annealing temperature of the samples, and all the samples were annealed for 2 hours.

DETAILED DESCRIPTION OF INVENTION

Introduction

Lithium rich layered NMC cathode materials following the composition $xLi_2MnO_3 \cdot (1-x)Li(Ni_{1/3}Mn_{1/3}Co_{1/3})O_2$ have received significant attention as cathode materials for PHEV and EV applications (1-4). The materials can deliver capacities in excess of 200 mAhg$^{-1}$ when charged above 4.6 V vs. Li/Li$^+$ by activating the $Li_2MnO_3$ structural component. Numerous papers have analyzed the activation process and the large irreversible first cycle capacity loss to understand the simultaneous structural reorganization (5-14). Most studies agree that the activation is coupled to a virtual loss of "Li$_2$O" from the structure, which progresses via a complex mechanism that leads to an irreversible structural transformation. Several studies have discussed the activation process (5, 15-17). A study by Simonin and coworkers is of particular importance to the current study as it suggests that during the initial cycle, a new cubic spinel phase forms that is very similar in nature to the original structure and is carried over throughout subsequent cycles influencing the capacity fade of the material (17).

Despite their high capacities, it has been recently determined that these materials display voltage fade due to an internal layered-spinel phase transition, which leads to an overall loss of power from the cathode material throughout cycling (18-22). Gu and coworkers found that for cobalt free materials the voltage fade is related to a continuous migration of Ni to the surface coupled to a layered-spinel phase transition (23). Mohanty et al. found a similar transformation of the materials during high voltage hold and cycling and their in situ XRD studies indicated a layered-spinel phase transformation coupled to the formation of a new phase due to migration of transitional metal (TM) ions between the lithium and TM layers (19, 20). The same authors found that when the upper cutoff voltage is 4.8 V, the cation ordering of the structure diminishes after the activation process; however the cation ordering is retained if the upper cutoff voltage is 4.2 V (21). Li and coworkers used synchrotron XRD techniques to understand the structural evolution of these materials (24). Their results suggest a migration of cations between the TM layers similar to other reports. Other studies discussing the gradual activation of the $Li_2MnO_3$ component, electrolyte additives, surface effects and analogous materials offer further insights to structural causes behind voltage fade (25) (26) (27). Lee and Manthiram synthesized Ti doped and layered composites of Li, Ni, Mn and Co (28). Their results indicated that the length of the second plateau during the first cycle, which is typically associated to the activation of the $Li_2MnO_3$ structural component, governs the voltage fade of the material and thus appropriate design of the cathode chemistry may reduce voltage fade. Earlier several studies (including those from our laboratory) found that compositions with a lower $Li_2MnO_3$ content display better structural stability and less voltage fade (3, 29-33). Significant progress has been made to understand voltage fade, however at this point no solution for stabilizing the materials and overcoming voltage fade is available.

Trace elemental doping is a widely reported technique for stabilizing cathode materials. Improved electrochemical performance was demonstrated with the addition of Al, Ti, Zr, Cr, Ru, Ga and Na, specifically for $xLi_2MnO_3 \cdot (1-x)LiMO_2$ materials, primarily by affecting the "Li2MnO3" structural component (1, 44, 45, 46, 48). While these studies demonstrated improvements of the electrochemical performance with the addition of dopants, none of them discussed their effect on voltage fade. The addition of rare and expensive dopants (e.g., Ru) may improve the cycleability significantly, however, they may not offer cost-competitive solutions for EVs.

Various synthesis methods exist for producing layered cathode materials including co-precipitation, solid-state synthesis, polymer-assisted synthesis, ball milling, combustion synthesis and spray pyrolysis (30, 34, 52-58). Among these methods, spray pyrolysis allows for a level of control of product purity that is unlikely to be reproduced by any other synthesis method. In the spray pyrolysis process each droplet acts as a microreactor, accurately preserving the composition of the precursor solution. The main particle formation mechanism is understood to be the one-droplet to one-particle (ODOP) mechanism (59). No additives are required, which allows accurate control of the dopant profile to trace levels in the product. The lack of precipitating aids also leads to an inherent purity of the product and the high temperature of the process yields product purity that meets or exceeds the purity of the precursor salts (60). In a recent study, it was demonstrated that the addition of small amounts of Li (<4 wt %) leads to well-preserved stoichiometries after annealing and that evaporative Li loss during synthesis and annealing is negligible, allowing the ultimate particle stoichiometry to be dictated by the precursor chemistry (31).

In the present study, the goal was to use inexpensive materials, including alkali (Na, K, Rb, Cs), alkaline earth (Mg, Ca, Sr, Ba) and Al as dopants to improve the voltage fade of layered $xLi_2MnO_3 \cdot (1-x)Li(Ni_{1/3}Mn_{1/3}Co_{1/3}) O_2$. These dopants were selected because substitute Li with alkali atoms was believed to allow the structures to be "pillared" when the material is almost completely deintercalated(77) and substituting Co, Ni, and Mn with alkaline earth metals and Al was believed to help increase the average valence state of the material and prevent fade mechanisms, such as Mn-dissolution. Of particular interest is $Li_{1.2}Mn_{0.54}Ni_{0.13}Co_{0.13}O_2$ (x=0.5), but $Li_{1.09}Mn_{0.43}Ni_{0.24}Co_{0.24}O_2$ (X=0.2) and $Li_{1.14}Mn_{0.46}AlNi_{0.2}Co_{0.2}O_2$ (x=0.3) will also be evaluated.

The following patent applications are incorporated herein by reference in their entireties:

"Spray Pyrolysis Synthesis of Mesoporous Positive Electrode Materials for High Energy Lithium-Ion Batteries," U.S. Ser. No. 13/462,563, filed on May 2, 2012; and "Method for the use of Slurries in Sprary Pyrolysis for the Production of Non-hollow, Porous Particles," PCT/US14/26641, filed on Mar. 13, 2014.

Of particular relevance in the foregoing applications are the methods of producing materials such as that disclosed herein via the disclosed spray pyrolysis methods and the resulting products, including the physical properties thereof (e.g., porosity, primary and secondary particles, mesoporosity, sphericity, controlled hollowness, non-hollow morphology, etc.).

EXPERIMENTAL

The precursor solution was prepared by dissolving $LiNO_3$, $Ni(NO_3)_2 \cdot 6H_2O$, $Co(NO_3)_2 \cdot 6H_2O$ (Alfa Aesar) and $Mn(NO_3)_2 \cdot 4H_2O$ (Sigma Aldrich) at the ratio corresponding to the doped $Li_{1.2-x}Mn_{0.54-y}Ni_{0.13}Co_{0.13-z}O_2$ chemistries in deionized water. The list of chemistries used for in the current study is displayed in Table 1 and includes the multidoped samples that will be discussed. Alkali metals are substitutes for Li, alkaline earth metals Co and Ni, and Al is a substitute for Mn and Ni. The total dissolved salt concentration was fixed at 2.5 $molL^{-1}$(M). The as-synthesized powders were typically heat treated at either 850° C. or 900° C. for 2 hours, as indicated in the text.

TABLE 1

|  | Chemical formula | Dopant levels |
|---|---|---|
| Alkali | $Li_{1.2-x}Na_xMn_{0.54}Ni_{0.13}Co_{0.13}O_2$ | 0.005, 0.01, 0.025, 0.05, 0.1 |
|  | $Li_{1.2-x}K_xMn_{0.54}Ni_{0.13}Co_{0.13}O_2$ | 0.005, 0.01 |
|  | $Li_{1.2-x}Rb_xMn_{0.54}Ni_{0.13}Co_{0.13}O_2$ | 0.005, 0.01 |
|  | $Li_{1.2-x}Cs_xMn_{0.54}Ni_{0.13}Co_{0.13}O_2$ | 0.005, 0.01 |
| Alkaline earth | $Li_{1.2}Mn_{0.54}Ni_{0.13}Co_{0.13-z}Mg_zO_2$ | 0.005, 0.01, 0.02 |
|  | $Li_{1.2}Mn_{0.54}Ni_{0.13}Co_{0.13-z}Ca_zO_2$ | 0.005, 0.01 |
|  | $Li_{1.2}Mn_{0.54}Ni_{0.13}Co_{0.13-z}Sr_zO_2$ | 0.005, 0.01 |
|  | $Li_{1.2}Mn_{0.54}Ni_{0.13}Co_{0.13-z}Ba_zO_2$ | 0.005, 0.01 |
|  | $Li_{1.2}Mn_{0.54}Ni_{0.13-z}Co_{0.13}Mg_zO_2$ | 0.005 |
|  | $Li_{1.2}Mn_{0.54}Ni_{0.13-z}Co_{0.13}Ca_zO_2$ | 0.005 |
|  | $Li_{1.2}Mn_{0.54}Ni_{0.13-z}Co_{0.13}Sr_zO_2$ | 0.005 |
|  | $Li_{1.2}Mn_{0.54}Ni_{0.13-z}Co_{0.13}Ba_zO_2$ | 0.005 |
| Al | $Li_{1.2}Mn_{0.54-y}Al_yNi_{0.13}Co_{0.13}O_2$ | 0.005, 0.01 |
|  | $Li_{1.2}Mn_{0.54}Al_yNi_{0.13-y}Co_{0.13}O_2$ | 0.005 |
| Multi-doped samples | $Li_{1.19}Na_{0.01}Mn_{0.53}Al_{0.01}Ni_{0.13}Co_{0.12}Ba_{0.01}O_2$ | 0.01 |
|  | $Li_{1.197}Na_{0.003}Mn_{0.541}Al_{0.003}Ni_{0.13}Co_{0.12}Ba_{0.003}O_2$ | 0.0033 |
|  | $Li_{1.197}Na_{0.003}Mn_{0.541}Al_{0.003}Ni_{0.13}Co_{0.12}Mg_{0.003}O_2$ | 0.0033 |
|  | $Li_{1.13}Na_{0.01}Mn_{0.45}Al_{0.01}Ni_{0.2}Co_{0.19}Ba_{0.01}O_2$ | 0.01 |
|  | $Li_{1.13}Na_{0.01}Mn_{0.45}Al_{0.01}Ni_{0.2}Co_{0.2}O_2$ | 0.01 |
|  | $Li_{1.08}Na_{0.01}Mn_{0.42}Al_{0.01}Ni_{0.24}Co_{0.23}Ba_{0.01}O_2$ | 0.01 |
|  | $Li_{1.08}Na_{0.01}Mn_{0.42}Al_{0.01}Ni_{0.24}Co_{0.24}O_2$ | 0.01 |

The annealed powders were characterized by XRD using a Rigaku Diffractometer (Geigerflex D-MAX/A) at a scan rate of 0.04° $s^{-1}$ between 10° and 80° 2θ. Particle morphology was examined with an FEI Nova 2300 Field Emission SEM.

The cathode film was fabricated according to the procedure reported earlier (61). A slurry was prepared using 10 wt % polyvinylidene fluoride (PVdF) binder solution (Kureha Corp. Japan), 10 wt % Super-C45 conductive carbon black (Timcal) suspended in 1-Methyl-2-pyrrolidinone (NMP—Sigma Aldrich) and 80 wt % active material. The active material loading density was between 3.0-5.0 $mgcm^{-2}$.

Half-cells were assembled for the electrochemical tests using pure lithium anodes and 2500 Celgard membranes (Celgard, LLC). The electrolyte was 1.0 M $LiPF_6$ in a solution of ethylene carbonate/diethyl-carbonate/dimethyl-carbonate (EC:DEC:DMC=1:1:1 by volume—MTI Corp.). The cells were typically activated between 2.0-4.8 V at 20 $mAg^{-1}$ (C/10) and then cycled between 2.0-4.6 V at 20 $mAg^{-1}$ for 4 cycles and then at 66.67 $mAg^{-1}$ (C/3) for 95 cycles. Rate capability tests ranged between 20 $mAg^{-1}$ (C/10) to 200 $mAg^{-1}$ (C/1) according to the testing protocols reported earlier (60). Electrochemical impedance spectra (EIS) were recorded with a Gamry Reference 600 potentiostat. The AC amplitude was 10 mV and the scan frequency was in the range of $5.0 \times 10^{-4}$-$1.0 \times 10^6$ Hz. The data were analyzed with the Gamry EChem Analyst.

Electrochemical performance of the powders was evaluated in 2032-type coin cells (Hohsen Corporation) that were assembled in an argon-filled glove box. Cycling tests were performed using an MTI-BST8-WA-type battery tester. All electrochemical tests were performed at 22° C.

RESULTS AND DISCUSSION

Material Selection

In the current study three dopant categories were selected: alkali metals, Al and alkaline earth metals. These dopant categories are discussed in the following sections below.

Alkali metal substitution primarily improves the stability of the structures due to the steric effects caused by the larger size of the dopants. By replacing $Li^+$ ions in the interstitial sites by larger alkali metals the amount of residual ions in the interstitial sites increases after charging, as observed for Na doping before (41, 55). Kim et al. found that the $Li_xMO_2$ based structures have strong driving forces and low energy kinetic paths to transform into a spinel structures while these driving forces do not exist for the Na based counterparts of the materials (56). These reactions are speculated to proceed via transitional metal hopping. The migration of the TM (e.g.: Mn) ions has to be coupled to the migration of $Li^+$ ions, which becomes hindered due to the larger size of $Na^+$ ions. This effect is expected to be more pronounced for larger K ions. Alkali metal substitutions are expected to lead to a minor loss of capacity due to a small reduction in the amount of intercalatable lithium.

Substituting Mn with Al leads to a slight reduction in the electrochemically active cathode material content of the sample with aluminum having only a single oxidation state. Al is similar in size and Mn and therefore steric effects and the single oxidation state may be the reasons behind the stability of Al doped compounds. Several studies demonstrated the beneficial effect of Al on stabilizing the cathode material primarily by creating Al coated surfaces to prevent surface dissolution of the cathode material (57-59).

Alkaline earth metals (Mg, Ca, Sr, Ba) have a larger ionic radii than $Co^{3+}$ atoms. Their introduction to the structure has been shown to improve the stability similar to Al and may reduce the capacity to a minor extent of the material (27, 29, 31, 60, 61). Earlier we observed by comparing the electrochemical performance of $Li_{1.2}Mn_{0.54}Ni_{0.13}Co_{0.13}O_2$ synthesized from cobalt nitrates supplied by different vendors, samples that had a significant amount of Ba contaminant displayed enhanced cycling stability compared to their Ba-free counterparts (unpublished results). The alkaline earth metals (e.g.: Mg) displaying a larger ionic radii and smaller electronegativity (Table 2) than cobalt demonstrated that by initiating a short range ordering in $LiNi_{0.80}Co_{0.15}Al_{0.05}O_2$ enhance cycle stability by providing stronger bonding (31). Therefore we expected an improvement in the stability of the samples to prevent the apparent layered-spinel transformation especially with the application of larger alkaline earth metals (Sr, Ba) replacing Co.

TABLE 2

| Dopant | Ionic radii (C.N. 6) (Å) | Electronegativity |
|---|---|---|
| $Mn^{4+}$ | 0.530 | 1.6 |
| $Co^{3+}$ | 0.545 | 1.9 |
| $Mn^{3+}$ | 0.580 | 1.6 |
| $Al^{3+}$ | 0.635 | 1.6 |
| $Ni^{2+}$ | 0.690 | 1.9 |
| $Mg^{2+}$ | 0.720 | 1.3 |
| $Li^{+}$ | 0.760 | 1.0 |
| $Ca^{2+}$ | 1.000 | 1.3 |
| $Na^{+}$ | 1.050 | 0.9 |
| $Sr^{2+}$ | 1.180 | 1.0 |
| $Ba^{2+}$ | 1.350 | 0.9 |
| $K^{+}$ | 1.380 | 0.8 |

TABLE 3

| Dopant | % Capacity Retained between Cycles 5-100 (%) |
|---|---|
| $Li_{1.2}Mn_{0.54}Ni_{0.13}Co_{0.13}O_2$ | 91.5 |
| $Li_{1.19}Na_{0.01}Mn_{0.54}Ni_{0.13}Co_{0.13}O_2$ | 91.1 |
| $Li_{1.19}K_{0.01}Mn_{0.54}Ni_{0.13}Co_{0.13}O_2$* | 97.3 |
| $Li_{1.2}Mn_{0.54}Ni_{0.13}Co_{0.12}Mg_{0.01}O_2$* | 104.7 |
| $Li_{1.2}Mn_{0.54}Ni_{0.13}Co_{0.12}Ca_{0.01}O_2$* | 100.1 |
| $Li_{1.2}Mn_{0.54}Ni_{0.13}Co_{0.12}Sr_{0.01}O_2$* | 99.4 |
| $Li_{1.2}Mn_{0.54}Ni_{0.13}Co_{0.12}Ba_{0.01}O_2$ | 92.2 |
| $Li_{1.2}Mn_{0.53}Al_{0.01}Ni_{0.13}Co_{0.13}O_2$ | 99.4 |

The effect of dopants on the capacity retention of the samples.
*indicates samples where due to the slow activation of the electrochemically active structures the capacities increased over time.

Material Characterization

Figure 1:
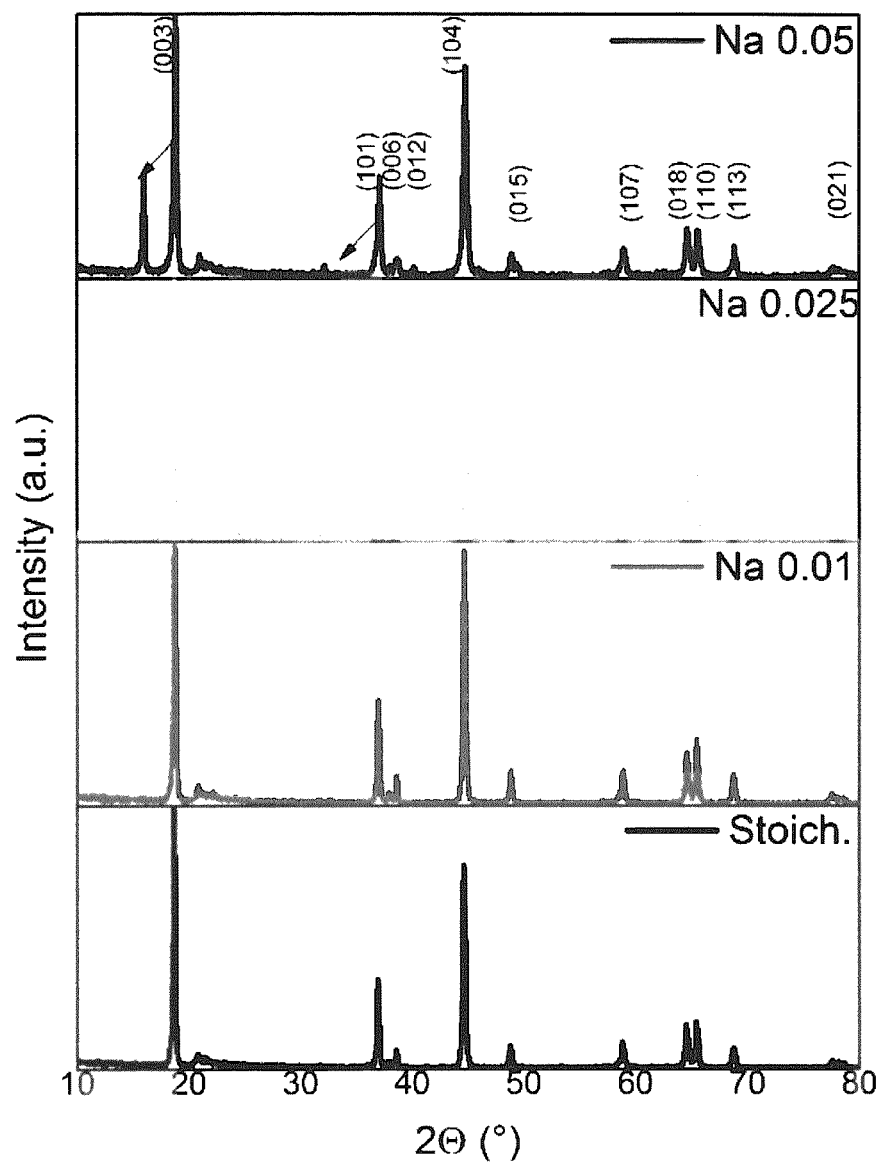
FIG. 1: XRD patterns of $Li_{1.2-x}Na_xMn_{0.54}Ni_{0.13}Co_{0.13}O_2$ for x=0, 0.025 and 0.05 (x=0.1 is omitted for clarity). The arrows indicate the new phase formation in the sample.

The goal of the present study was to synthesize doped samples, where the dopant levels do not lead to any major reduction in electrochemical performance compared to dopant-free NMC samples or a detectable phase separation in the XRD profiles and improve voltage fade. To experimentally test what dopant levels do not leave to phase separation for materials synthesized via spray pyrolysis Na doped samples were prepared. FIG. 1 shows the XRD profiles for $Li_{1.2-x}Na_xMn_{0.54}Ni_{0.13}Co_{0.13}O_2$, where x=0, 0.01, 0.025 and 0.05 Na doped samples. Most peaks can are characteristic of the layered-layered chemistry having a rock salt pattern α-$NaFeO_2$ R$\bar{3}$m structure, with the superlattice reflections between 20-25 °2θ corresponding to the ordering of the $Li_2MnO_3$ and $LiMO_2$ components in the TM layers. The clear splitting of the (006), (012) and (018), (110) peaks indicate the layered structure of the material (21). When Na levels reach or exceed 0.05 an additional phase forms, which is speculated to be a spinel $NaMn_xO_y$ that leads to the new peaks in the structure's XRD pattern, as indicated by the arrows, similar to those reported by Qiu et al (39). No phase separation can be observed for substituent concentrations up to x=0.025.

It is understood that different dopants may lead to new phase formation at different concentrations. As most substituents have smaller ionic radii than $Na^+$ that does not lead to a phase separation for concentrations below x=0.025, substituent levels were typically kept at 0.01 for most dopants. For materials with these low dopant levels no phase separation was observed by XRD and these spectra are omitted for clarity. The ionic radii in the discussion are based upon those defined by Shannon (62).

Figure 2:
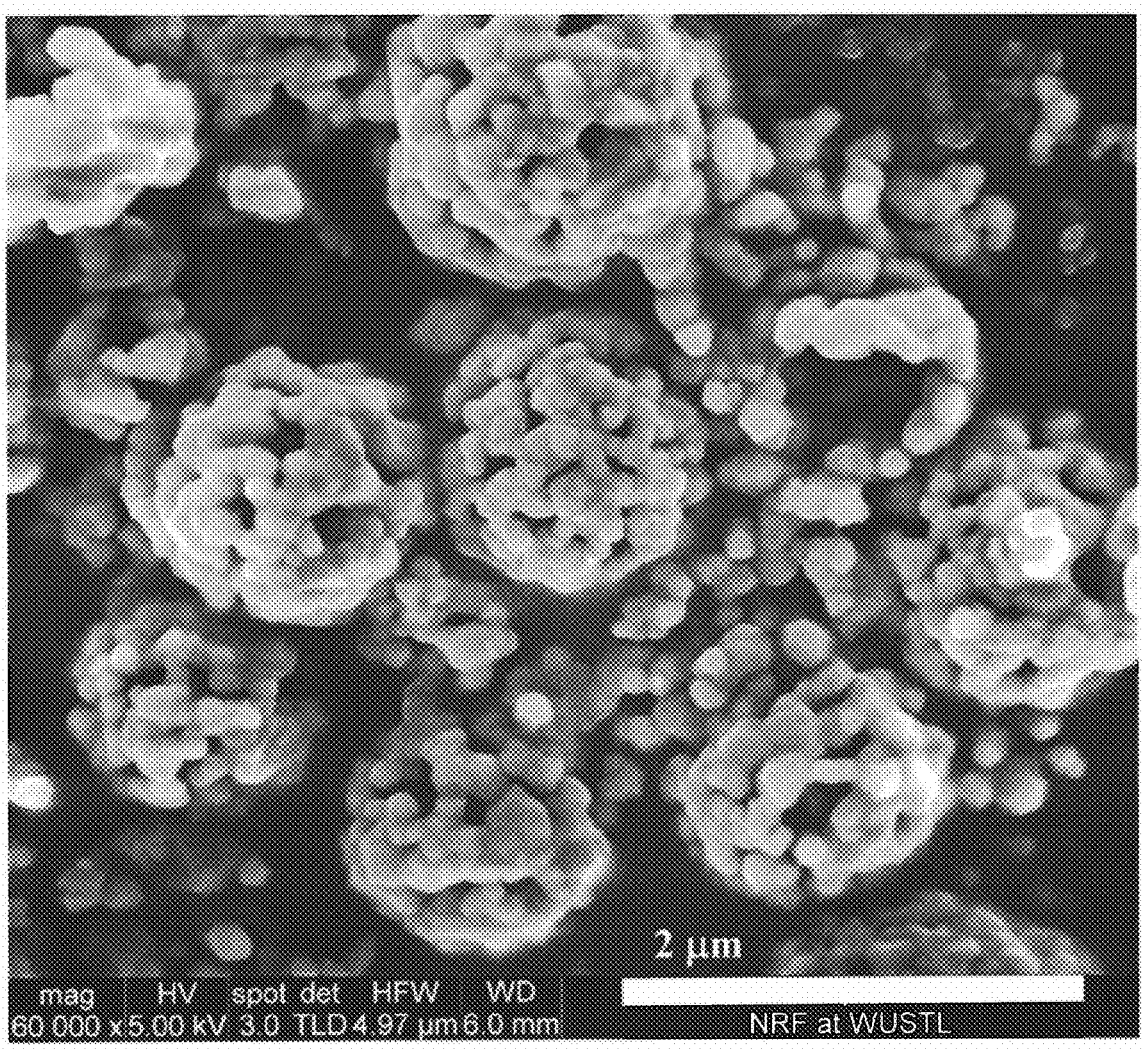
FIG. 2: SEM micrograph displaying a typical morphology for powders. The SEM shows $Li_{1.2}Mn_{0.54}Ni_{0.13}Co_{0.12}Sr_{0.01}O_2$ after annealing at 900° C. for 2 hours.

The low dopant levels did not induce noticeable changes in the particle morphology compared to our earlier reports (63). FIG. 2 shows the typical morphology of the particles synthesized via ultrasonic spray pyrolysis. The secondary particles are porous and primarily spherical in shape, and have a mean particle size around 1.7 μm (63). Primary particles are between 150-300 nm and are randomly oriented inside the secondary particles.

Electrochemical Testing Results

Figure 3:
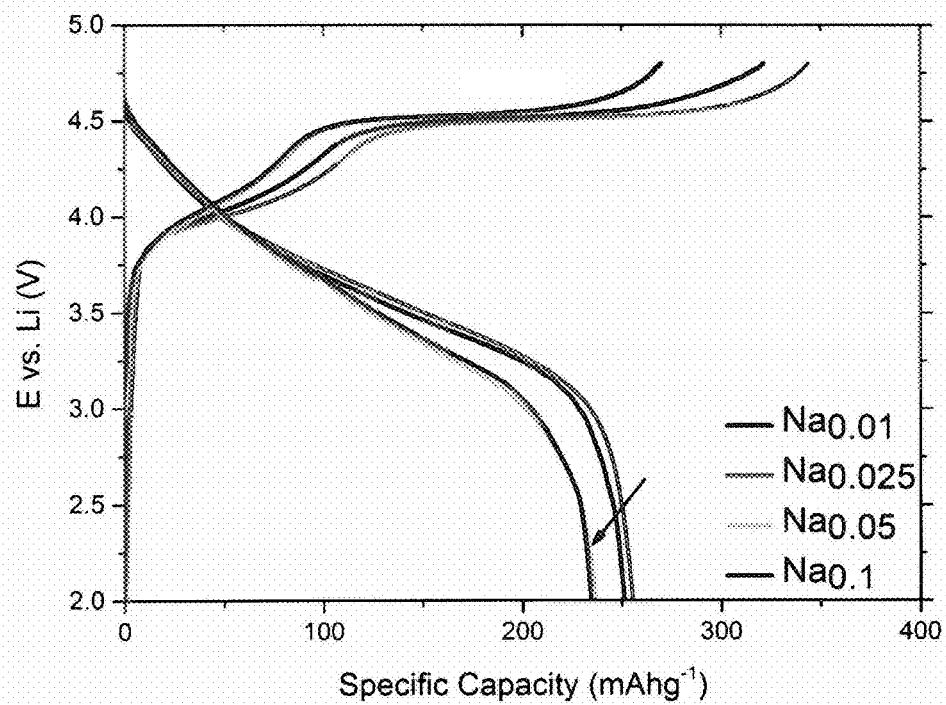
FIG. 3: Initial charge and discharge profiles at a constant current density of 20 $mAg^{-1}$ between 2.0 and 4.8 V for $Li_{1.2-x}Na_xMn_{0.54}Ni_{0.13}Co_{0.13}O_2$, where x=0.01, 0.025, 0.05 and 0.1.

The electrochemical properties of the cathode materials were tested in 2032 type coin cells vs. Li anodes. A constant-current, constant-voltage cycling protocol was applied for the cells. Details of the cycling and rate capability test protocols were reported earlier (52). FIG. 3 shows the initial charge and discharge curves for $Li_{1.2-x}Na_xMn_{0.54}Ni_{0.13}Co_{0.13}O_2$, where x=0.01, 0.025, 0.05 and 0.1. All the samples display two plateaus associated with the activation of the two structural components (44). It can be clearly observed that the appearance of the additional spinel phase for x=0.05 and 0.1 reduces the charge and discharge capacity of the materials by ~20 $mAhg^{-1}$ as indicated by the arrow. These results further indicate that any phase separation detectable by XRD will have a significant impact on the electrochemical performance of the material. Therefore dopant levels of samples were typically maintained around 0.01 to ensure that they will have minimal effect on the charge and discharge capacities of the materials.

Figure 14:
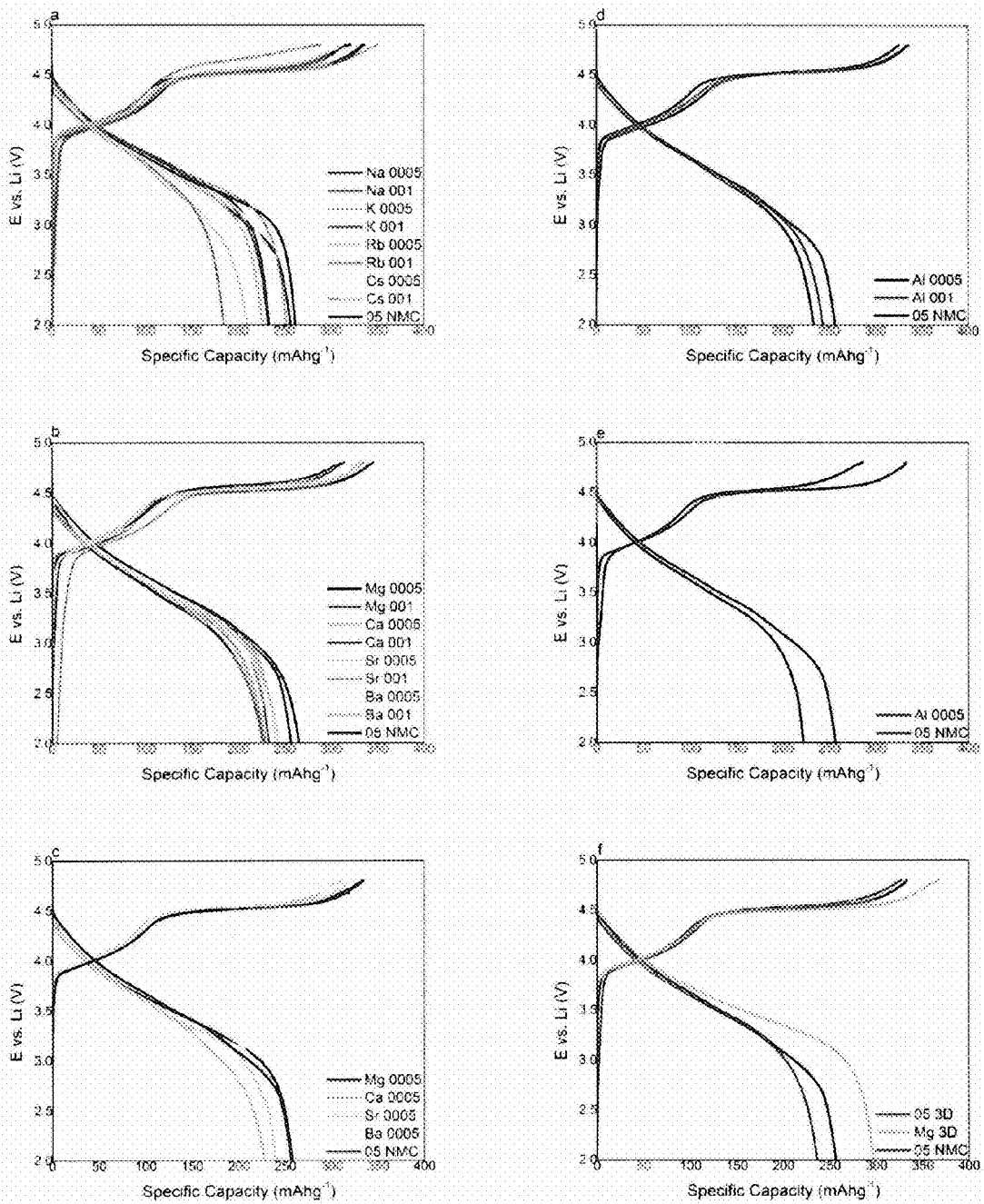
FIG. 14: Initial charge and discharge profiles at a constant current density of 20 $mAg^{-1}$ between 2.0 and 4.8 V for $Li_{1.2}Mn_{0.54}Ni_{0.13}Co_{0.13}O_2$ samples doped with typically 0.005 or 0.01 level of (a) Na, K, Rb or Cs substituting Li; (b) Mg, Ca, Sr or Ba substituting Co; (c) Mg, Ca, Sr or Ba substituting Ni; (d) Al substituting Mn; (e) Al substituting Ni; and (f) $Li_{1.2}Mn_{0.54}Ni_{0.13}Co_{0.13}O_2$ triply substituted with Na, Ba, Al indicated as "05 3D" or Na, Mg, Al indicated as "Mg 3D" at a total dopant level of 0.01 with equal distribution (0.01/3 for each) of dopant.

FIG. 14 shows the initial charge and discharge profiles of the $Li_{1.2}Mn_{0.54}Ni_{0.13}Co_{0.13}O_2$ samples doped with Na, K, Rb, Cs Mg, Ca, Sr, Ba and Al after annealing at 900° C. for 2 hours (see Table 1). All the materials display two activation-plateaus during the initial charge cycle characteristic of the layered compounds. The initial charge and discharge capacities drop slightly for most dopants at 0.005 levels and for certain elements (e.g. K, Rb and Ca), more significant drop can be observed at the 0.01 dopant levels. Descending with dopants in the alkali group, continuous, smooth trends were anticipated as the dopants were varied from Na to Cs, since the atoms are isoelectronic and most of the quantitative properties (e.g., ionic radii, boiling point, melting point, electronegativity) follow trends. There are no trends for alkali dopants in terms of electrochemical performance, indicating that effective ionic radii and electronegativity may not be the most important properties determining the electrochemical performance.

Figure 4:
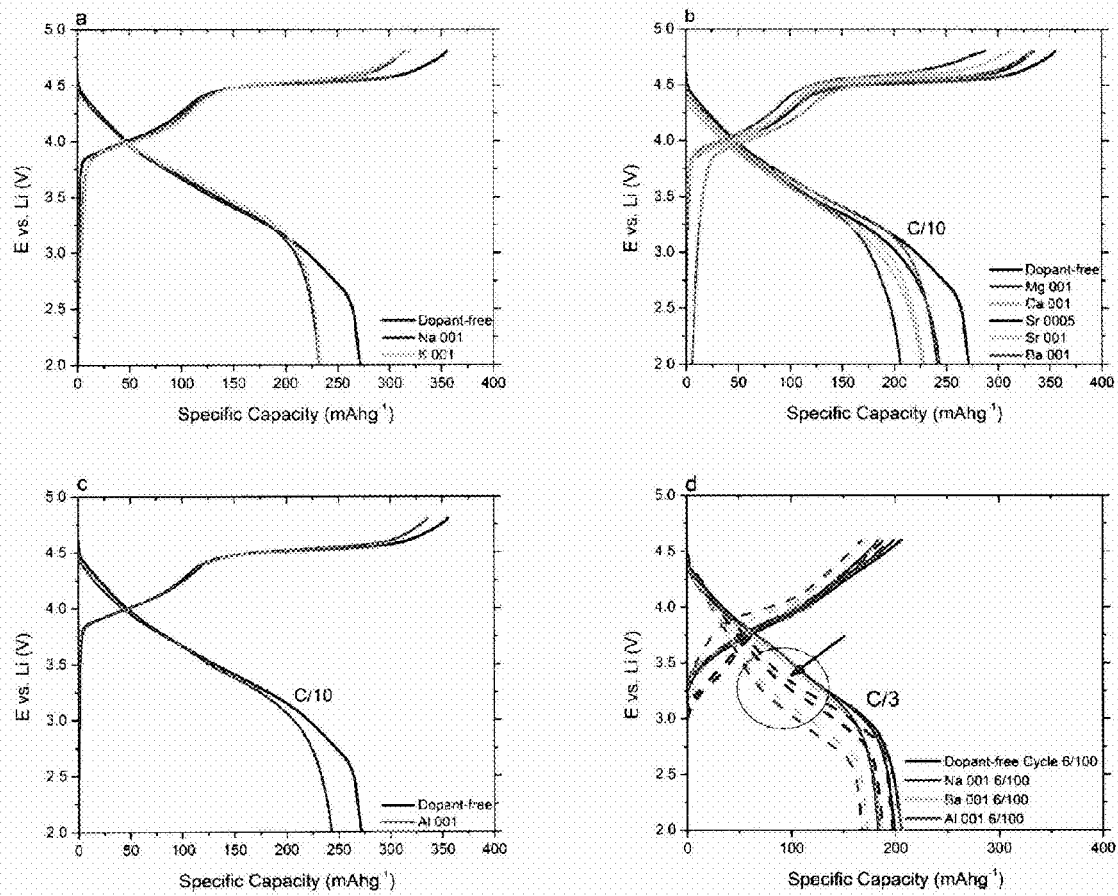
FIG. 4: Initial charge and discharge profiles at a constant current density of 20 $mAg^{-1}$ between 2.0 and 4.8 V for $Li_{1.2}Mn_{0.54}Ni_{0.13}Co_{0.13}O_2$ samples doped at various levels with (a) Na and K; (b) Mg, Ca, Sr and Ba; (c) Al; (d) comparison of charge and discharge profile of cycle 6 and 100 for the dopant-free, Na, Al and Ba doped samples. The circled area indicates the voltage fade occurring during the discharge cycles.

FIG. 4 a, b and c show the initial charge and discharge profiles of the $Li_{1.2}Mn_{0.54}Ni_{0.13}Co_{0.13}O_2$ samples doped with Na, K, Mg, Ca, Sr, Ba and Al after annealing at 900° C. for 2 hours. All the materials display the two stage activation corresponding to the two layered components. The initial charge and discharge capacities drop slightly due to the dopants, however no significant drop can be observed, which confirms that substituted dopant levels do not affect the electrochemical performance of the sample significantly. The charge and discharge curves do not display additional peaks or shape changes that would imply considerable structural changes.

Figure 5:
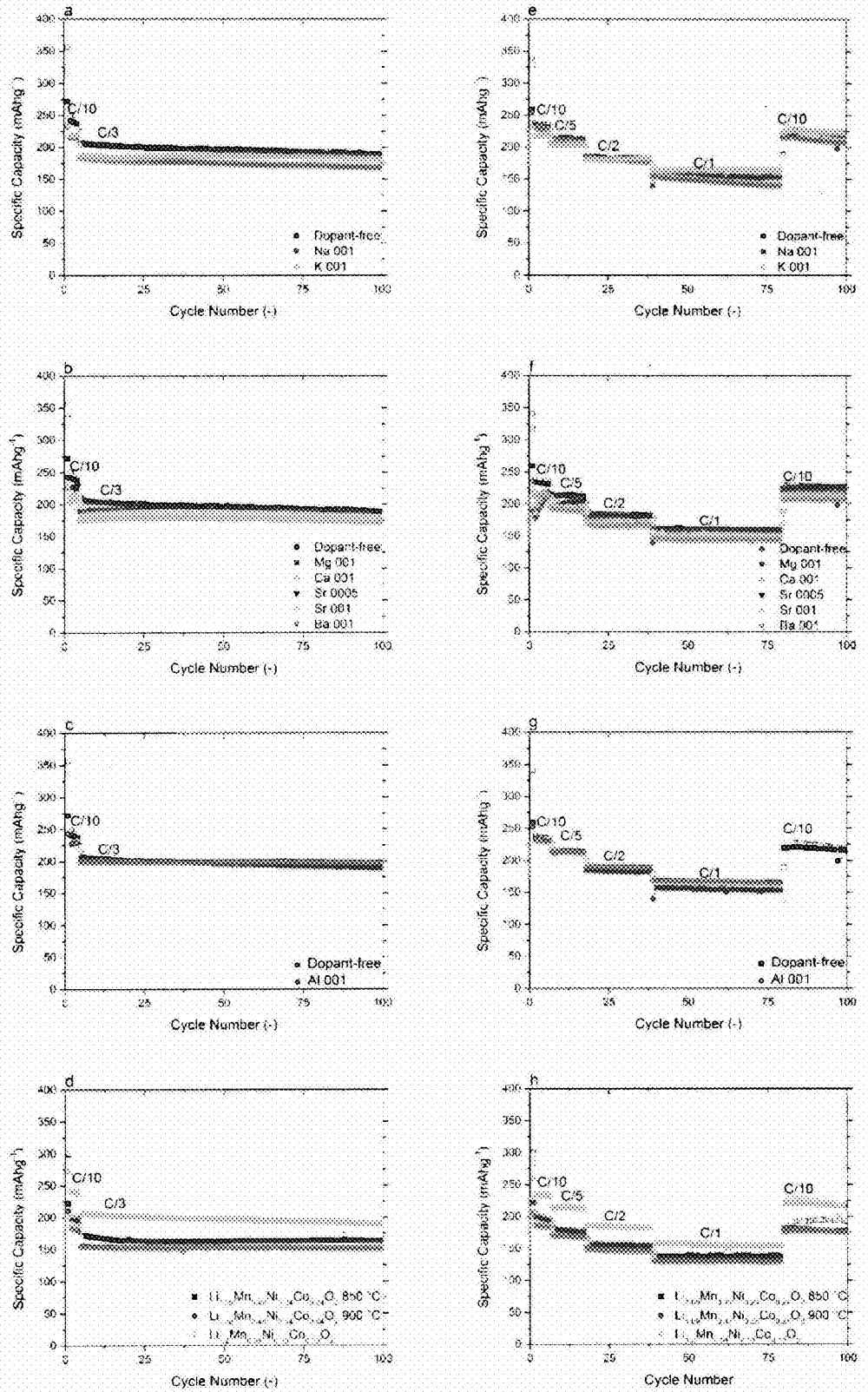
FIG. 5: Cycling performance of cells doped with (a) Na and K; (b) Mg, Ca, Sr and Ba; (c) Al; (d) $Li_{1.09}Mn_{0.43}Ni_{0.24}Co_{0.24}O_2$ annealed at 850° C. for 2 hours and 900° C. for 2 hours. Rate capability tests of cells synthesized at cells doped with (e) Na and K; (f) Mg, Ca, Sr and Ba; (g) Al; (h) $Li_{1.09}Mn_{0.43}Ni_{0.24}Co_{0.24}O_2$ annealed at 850° C. for 2 hours and 900° C. for 2 hours. The open/solid symbols show charge/discharge capacities, respectively.
Figure 6:
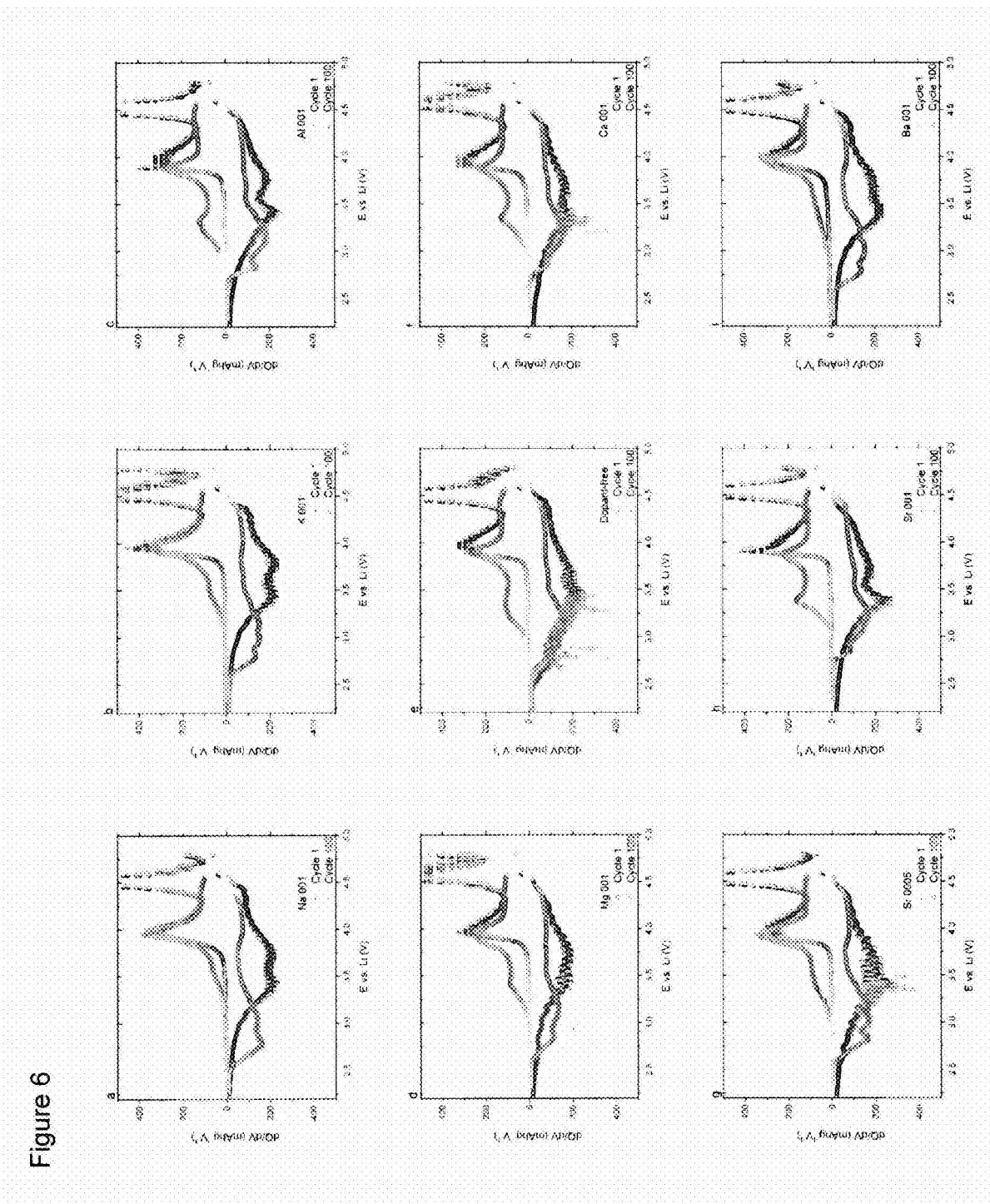
FIG. 6: dQ/dV curves of cycle 1 and cycle 100 of cells doped with (a) Na 0.01; (b) K 0.01; (c) Al 0.01; (d) Mg 0.01; (e) Dopant-free; (f) Ca 0.01; (g) Sr 0.005; (h) Sr 0.01; and (i) Ba 0.01.

FIG. 5 compares the cycle and rate capability test results for the doped samples. All dopants affect the capacity retention of the materials. Alkali and alkaline earth dopants at the 0.01 dopant level typically cause an extended activation in the $Li_2MnO_3$ component of the samples, which can be seen by the increasing slope of the cycle tests (25). Al doping clearly leads to an improved capacity retention of the samples, which can be observed both in the cycle and rate capability tests. FIG. 4 d compares the charge and discharge curves of cycle 6 and 100 for the Na, Al and Ba doped $Li_{1.2}Mn_{0.54}Ni_{0.13}Co_{0.13}O_2$ samples as examples. The addition of Al also reduces the voltage fade of the sample, while no other dopant leads to a similar improvement as indicated by the charge and discharge profiles. When the dQ/dV curves of the samples are compared for cycle 6 and 100 in FIG. 6, interestingly, Al does not seem to reduce the growth of the spinel peak that is responsible for voltage fade significantly and leads to better resolved peak splitting. Alkali and alkaline earth metals however display reduced spinel phase peaks during primarily the charge, but also often in the discharge curves after 100 cycles. This implies that Al doping improves the capacity retention of the samples via a different mechanism as reported for several $LiMn_xO_y$ based spinel materials (64-66). These results are further confirmed by the observed capacity retention of the samples. While the dopant-free sample retains 91.5% of its capacity between cycles 6-100 at C/3 rate, which are among the best results for these materials reported in the literature, this is further improved to 99.5% by Al doping (3, 46, 67). Other alkali and alkaline earth dopants do not lead to similar improvements. Several samples, which are indicated with a * symbol display an extended activation and thus increasing capacities, which lead to higher observed capacity retention. The discharge capacity of these samples starts to slowly fade by the time they reach 100 cycles and thus these dopants do not improve capacity retention of the samples as well as Al.

Figure 15:
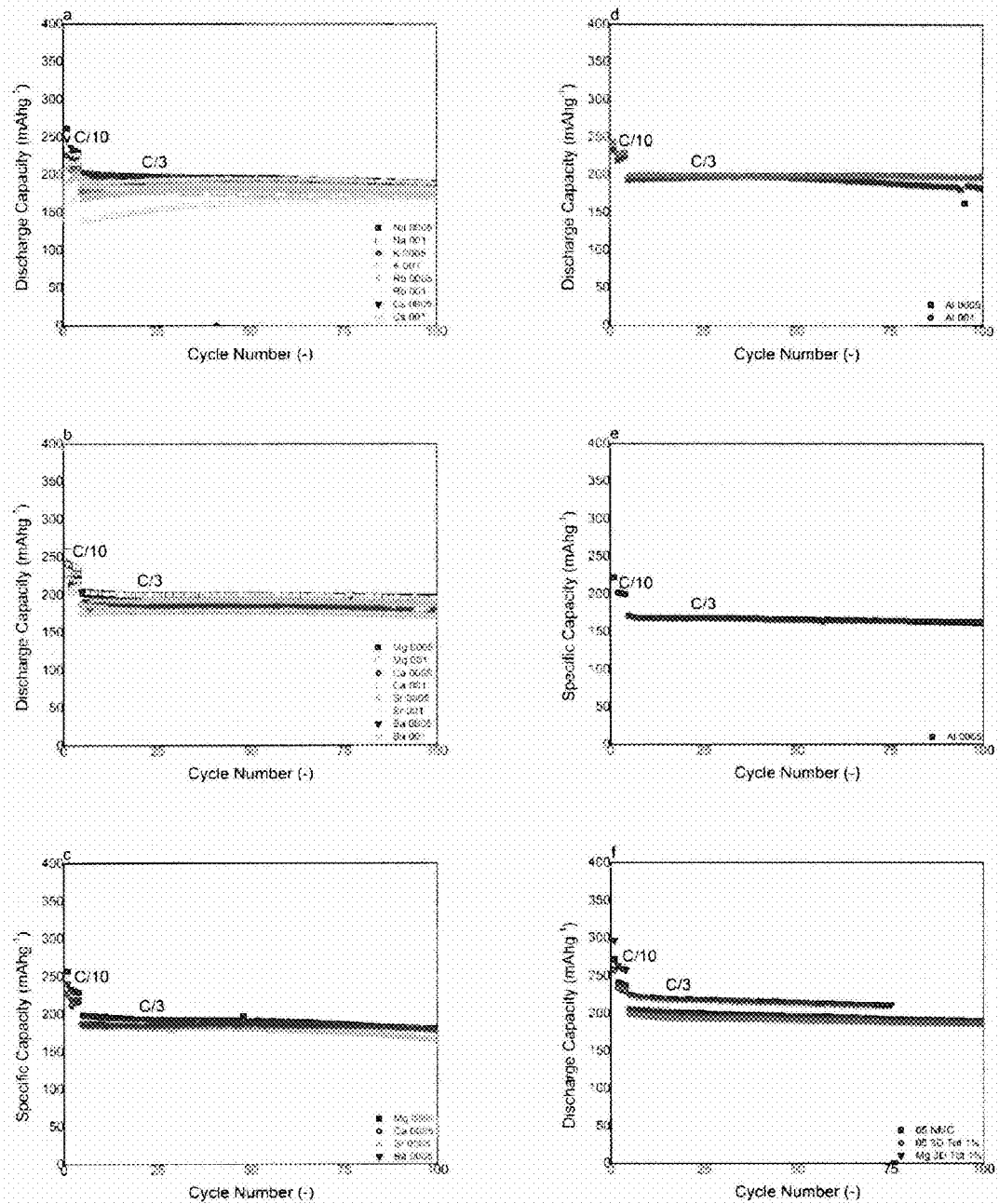
FIG. 15: Cycling performance of cells doped with (a) 0.005 or 0.01 levels of Na, K, Rb or Cs substituting Li; (b) 0.005 or 0.01 levels of Mg, Ca, Sr or Ba substituting Co; (c) 0.005 Mg, Ca, Sr or Ba substituting Ni; (d) 0.005 or 0.01 level of Al substituting Mn; (e) 0.005 level of Al substituting Ni; and (f) $Li_{1.2}Mn_{0.54}Ni_{0.13}Co_{0.13}O_2$ triply substituted with Na, Ba, Al indicated as "05 3D" or Na, Mg, Al indicated as "Mg 3D" at a total dopant level of 0.01 with equal distribution (0.01/3 for each) of dopant. C/10 equals a current density of 20 $mAg^{-1}$, while C/3 equals 66.67 $mAg^{-1}$.
Figure 16:
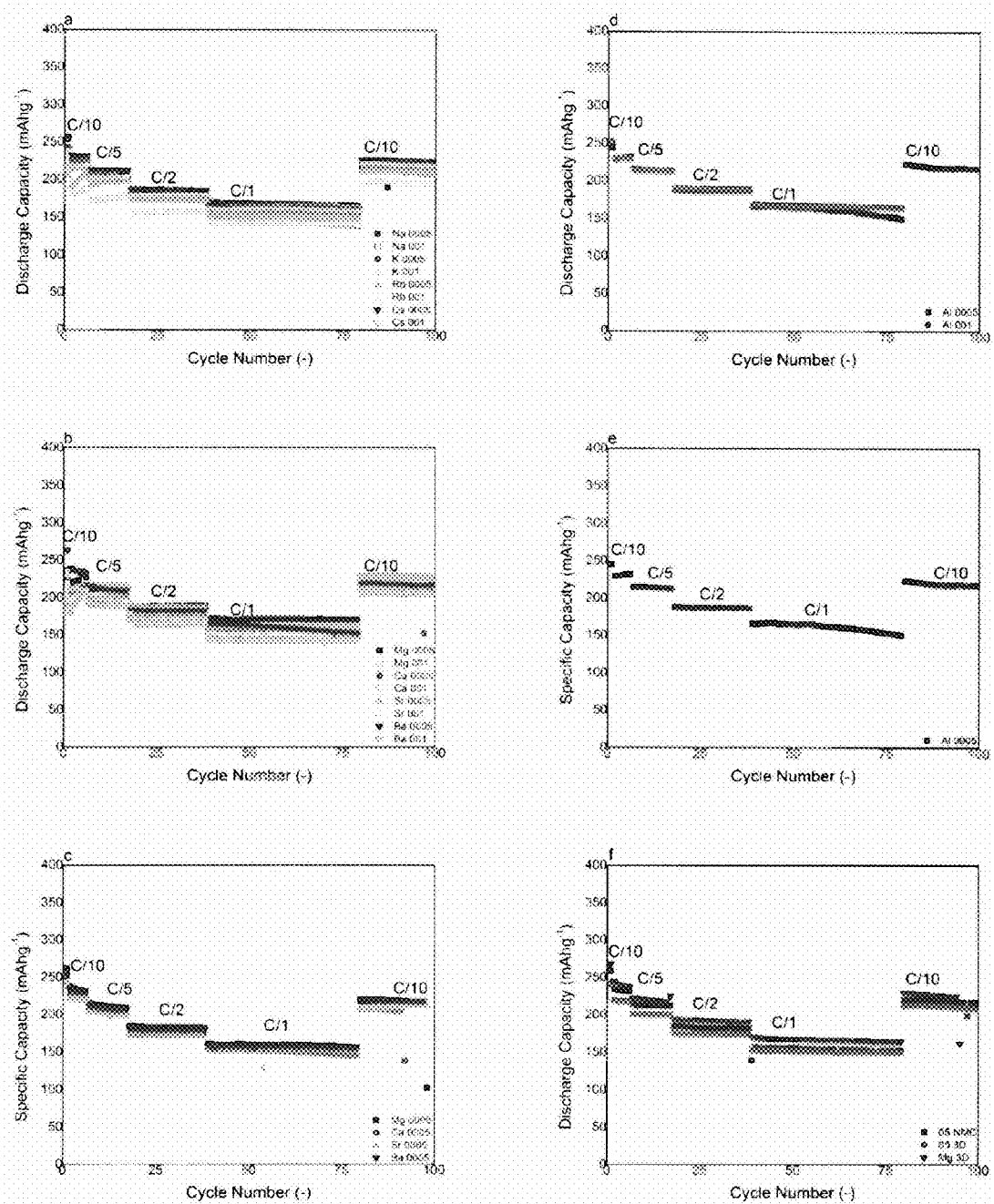
FIG. 16: Rate capability test performance of cells doped with (a) 0.005 or 0.01 levels of Na, K, Rb or Cs substituting Li; (b) 0.005 or 0.01 levels of Mg, Ca, Sr or Ba substituting Co; (c) 0.005 Mg, Ca, Sr or Ba substituting Ni; (d) 0.005 or 0.01 level of Al substituting Mn; (e) 0.005 level of Al substituting Ni; and (f) $Li_{1.2}Mn_{0.54}Ni_{0.13}Co_{0.13}O_2$ triply substituted with Na, Ba, Al indicated as "05 3D" or Na, Mg, Al indicated as "Mg 3D" at a total dopant level of 0.01 with equal distribution (0.01/3 for each) of dopant. C/10, C/5, C/2 and C/1 correspond to a current density of 20, 40, 100, 200 $mAg^{-1}$, respectively.

FIG. 15 compares the cycle and rate capability test results for the doped samples. The larger alkali and alkaline earth dopants as mentioned above, typically cause an extended activation in the samples. Doping with Al clearly leads to an improved capacity retention and the result is clearly among the best reported for these materials. Similar trends can be observed in the cycling tests (e.g., Al doping improving the capacity and retention or Na, Mg and Al triple doping the overall capacity of the samples as seen in FIGS. 15 and 16), the effects are likely more complex.

The dopants were incorporated to primarily effect the second voltage plateau occurring during charging, which is conventionally associated with the "$Li_2MnO_3$" structural component. Most dopants primarily affect this plateau (see Table 4) and this component, with larger changes observed in the capacities at the higher, 0.01 dopant levels (see also refs. 11-15).

Figure 7:
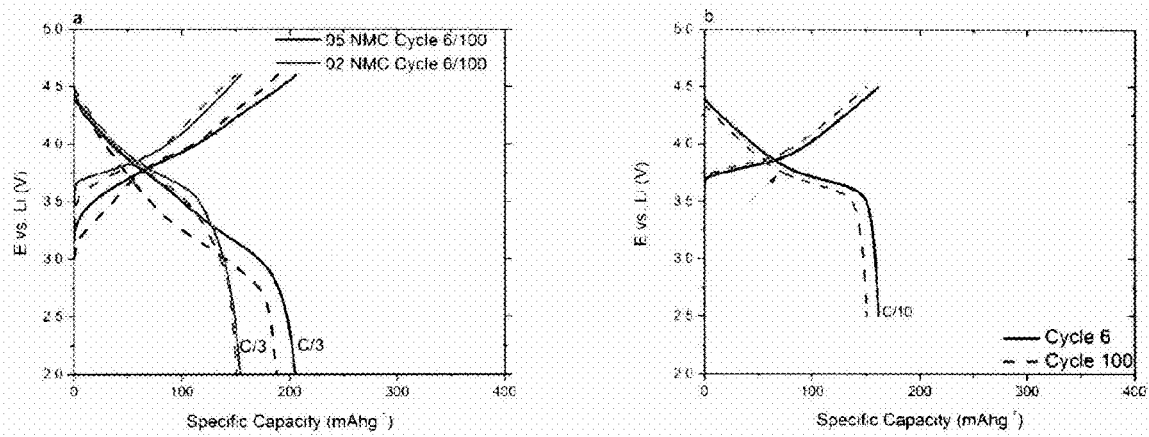
FIG. 7: Comparison of the charge and discharge profile of cycle 6 and 100 for (a) $Li_{1.09}Mn_{0.43}Ni_{0.24}Co_{0.24}O_2$ and $Li_{1.2}Mn_{0.54}Ni_{0.13}Co_{0.13}O_2$ cycled at C/3 rate; (b) $LiMn_{1/3}Ni_{1/3}Co_{1/3}O_2$ cycled at C/10 rate.
Figure 8:
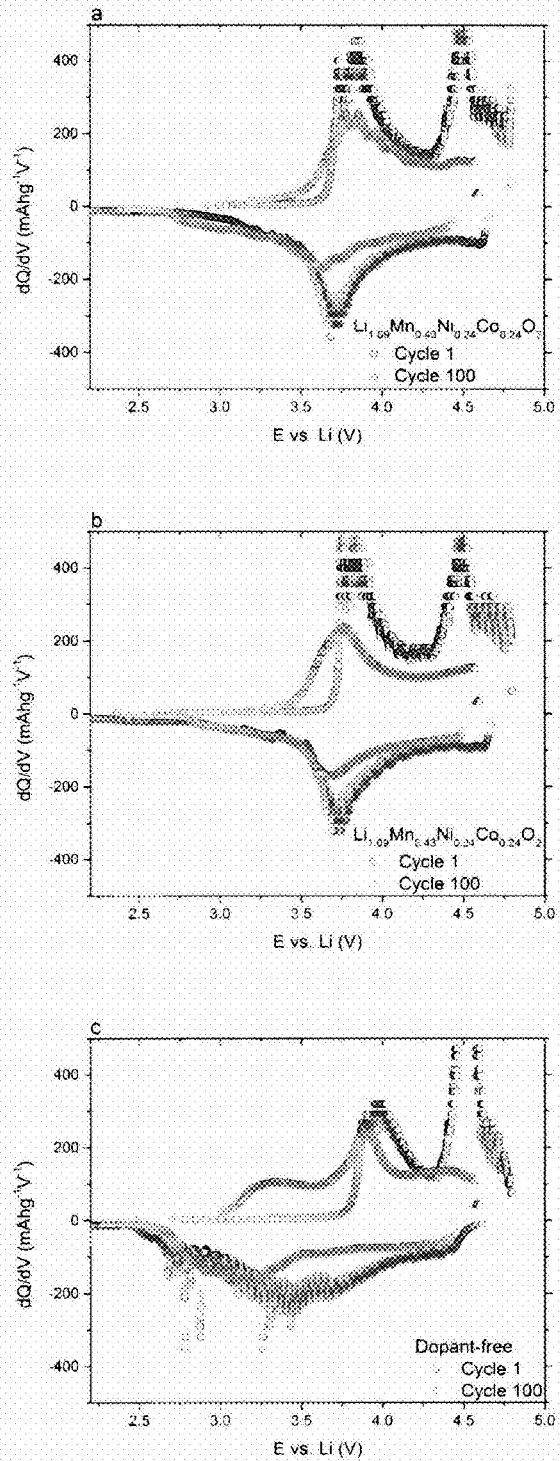
FIG. 8: dQ/dV curves of cycle 1 and cycle 100 of (a) $Li_{1.09}Mn_{0.43}Ni_{0.24}Co_{0.24}O_2$ annealed at 850° C. for 2 hours; (b) $Li_{1.09}Mn_{0.43}Ni_{0.24}Co_{0.24}O_2$ annealed at 900° C. for 2 hours; and (c) $Li_{1.2}Mn_{0.54}Ni_{0.13}Co_{0.13}O_2$.

Earlier several reports experimentally observed that a reduction in the $Li_2MnO_3$ content of the materials leads to reduced voltage fade and identified this structural component as a major contributor leading to the voltage fade of the layered chemistry {Lee, 2014 #335; Zhang, 2014 #141; Ghanty, 2014 #348}. Therefore in the present study we synthesized 0.2 $Li_2MnO_3 \cdot 0.8 Li(Ni_{1/3}Mn_{1/3}Co_{1/3}) O_2$ or in a different notation $Li_{1.09}Mn_{0.43}Ni_{0.24}Co_{0.24}O_2$ as it will be referred to below. FIG. 5 d and h show the cycle and the rate capability of the materials after annealing at 850° C. for 2 hours and 900° C. for 2 hours. While the displayed capacities are lower than those reported in the literature for this chemistry, we did not perform an annealing optimization to increase the capacity values for these preliminary results (67). The charge and discharge curves of this chemistry are compared to that of $Li_{1.2}Mn_{0.54}Ni_{0.13}Co_{0.13}O_2$ as displayed in FIG. 7 a. As expected, the reduction of the $Li_2MnO_3$ content reduces the voltage fade significantly and the voltage profile resembles that of $LiMn_{1/3}Ni_{1/3}Co_{1/3}O_2$ (FIG. 7 b), which was prepared earlier in the laboratory and cycled at C/10 rate between 2.5-4.5 V (unpublished results). When comparing the dQ/dV curves for $Li_{1.09}Mn_{0.43}Ni_{0.24}Co_{0.24}O_2$ annealed at 850° C. for 2 hours, $Li_{1.09}Mn_{0.43}Ni_{0.24}Co_{0.24}O_2$ annealed at 900° C. for 2 hours; and $Li_{1.2}Mn_{0.54}Ni_{0.13}Co_{0.13}O_2$ annealed at 900° C. for 2 hours (FIG. 8) the additional spinel peak is reduced due to the smaller amount of $Li_2MnO_3$ in the samples.

Having obtained these results we wanted to evaluate if by lowering the $Li_2MnO_3$ content of the material and by selectively doping the samples is it possible to eliminate or significantly reduce the voltage fade of the samples as indicated by the dQ/dV curves. In a different aspect we wanted to evaluate the effect of these dopants on other components of the $xLi_2MnO_3 \cdot (1-x)Li(Ni_{1/3}Mn_{1/3}Co_{1/3})O_2$ chemistries with the understanding that samples, where $x \leq 0.5$ are expected to be more easily stabilized and therefore are of higher practical importance due to the reduced $Li_2MnO_3$ content of the material. Since a reduction in the new peaks arising in the dQ/dV curves throughout the cycling was observed for both alkali and alkaline earth dopants while Al doping improved the capacity retention of the samples, as an example we synthesized Na, Al and Ba triple-doped samples.

Figure 9:
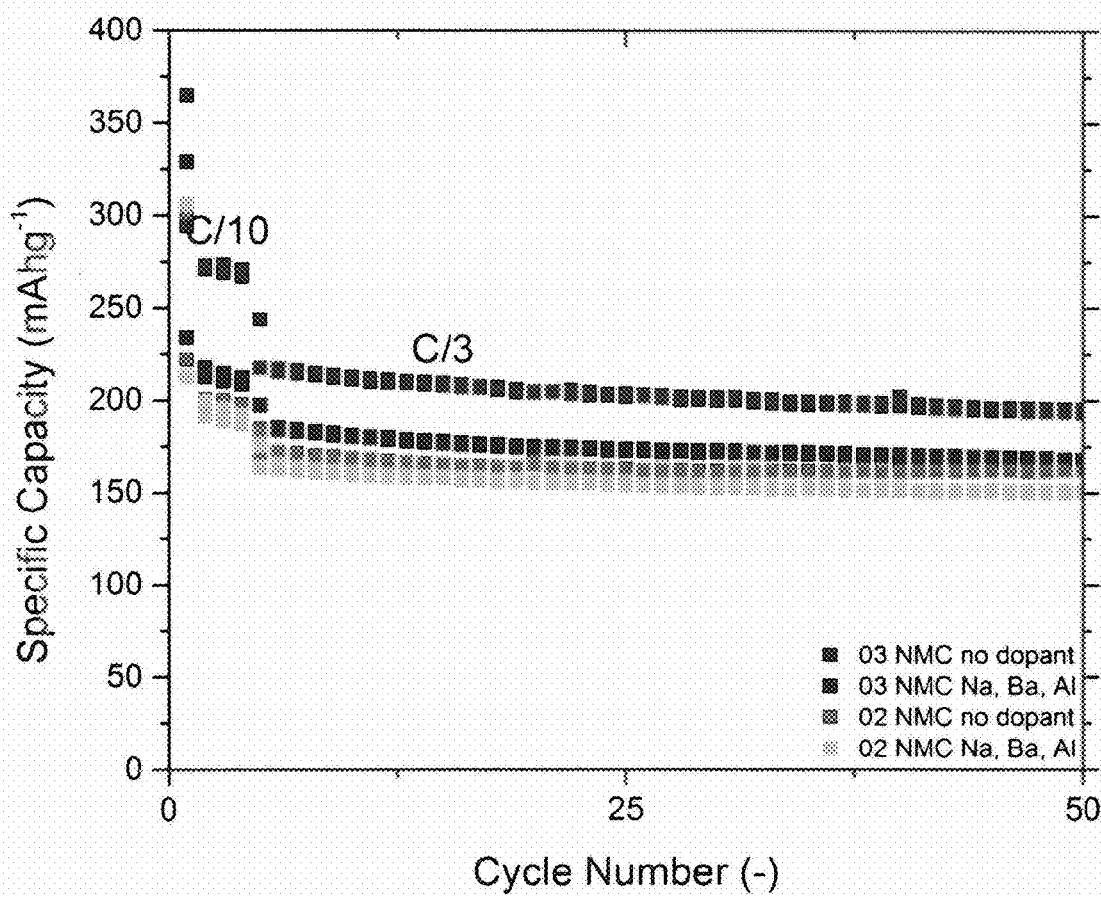
FIG. 9: Cycling performance of dopant-free and triple doped $Li_{1.09}Mn_{0.43}Ni_{0.24}Co_{0.24}O_2$, $Li_{1.14}Mn_{0.46}Ni_{0.2}Co_{0.2}O_2$ and $Li_{1.2}Mn_{0.54}Ni_{0.13}Co_{0.13}O_2$.
Figure 10:
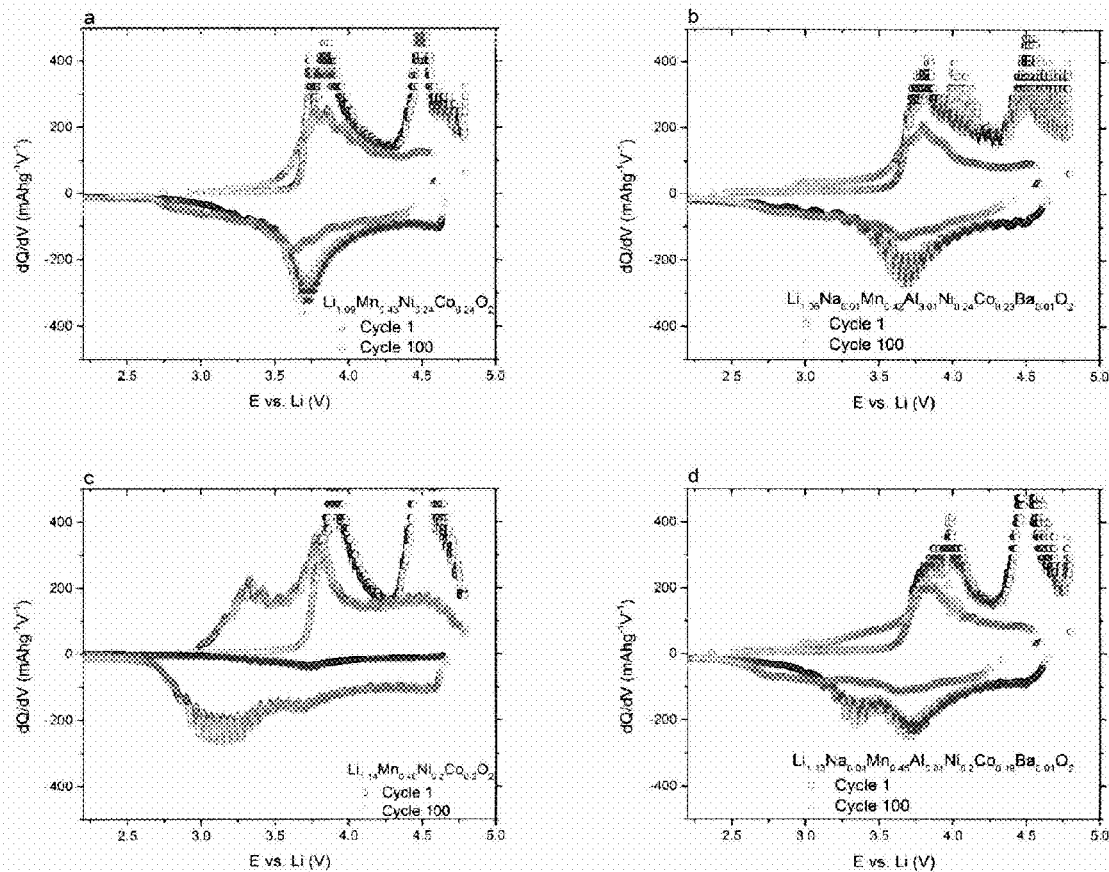
FIG. 10: dQ/dV curves of cycle 1 and cycle 100 of (a) $Li_{1.09}Mn_{0.43}Ni_{0.24}Co_{0.24}O_2$ annealed at 850° C. for 2 hours; (b) $Li_{1.08}Na_{0.01}Mn_{0.42}Al_{0.01}Ni_{0.24}Co_{0.23}Ba_{0.01}O_2$ annealed at 800° C. for 2 hours; (c) $Li_{1.14}Mn_{0.46}AlNi_{0.2}Co_{0.2}O_2$ annealed at 850° C. for 2 hours; and (d) $Li_{1.13}Na_{0.01}Mn_{0.45}Al_{0.01}Ni_{0.2}Co_{0.19}Ba_{0.01}O_2$ annealed at 800° C. for 2 hours.

FIG. 9 shows the cycling test results for dopant-free and triple doped $Li_{1.09}Mn_{0.43}Ni_{0.24}Co_{0.24}O_2$, $Li_{1.14}Mn_{0.46}Ni_{0.2}Co_{0.2}O_2$ and $Li_{1.2}Mn_{0.54}Ni_{0.13}Co_{0.13}O_2$ samples. No significant reduction can be observed in the charge and discharge capacities of the samples when tested at room temperature. Comparing the dQ/dV curves of the samples for cycle 100 (FIG. 10) all three materials display significant improvement compared to the dopant-free materials and less spinel phase evolution. To the best knowledge of the authors these results demonstrate for the first time experimental improvements to the voltage fade of the layered chemistries by simple, inexpensive dopant substitution. Currently it is not clear whether there is a synergetic effect between the different dopants or their results are simply combined to yield improved performance.

Figure 17:
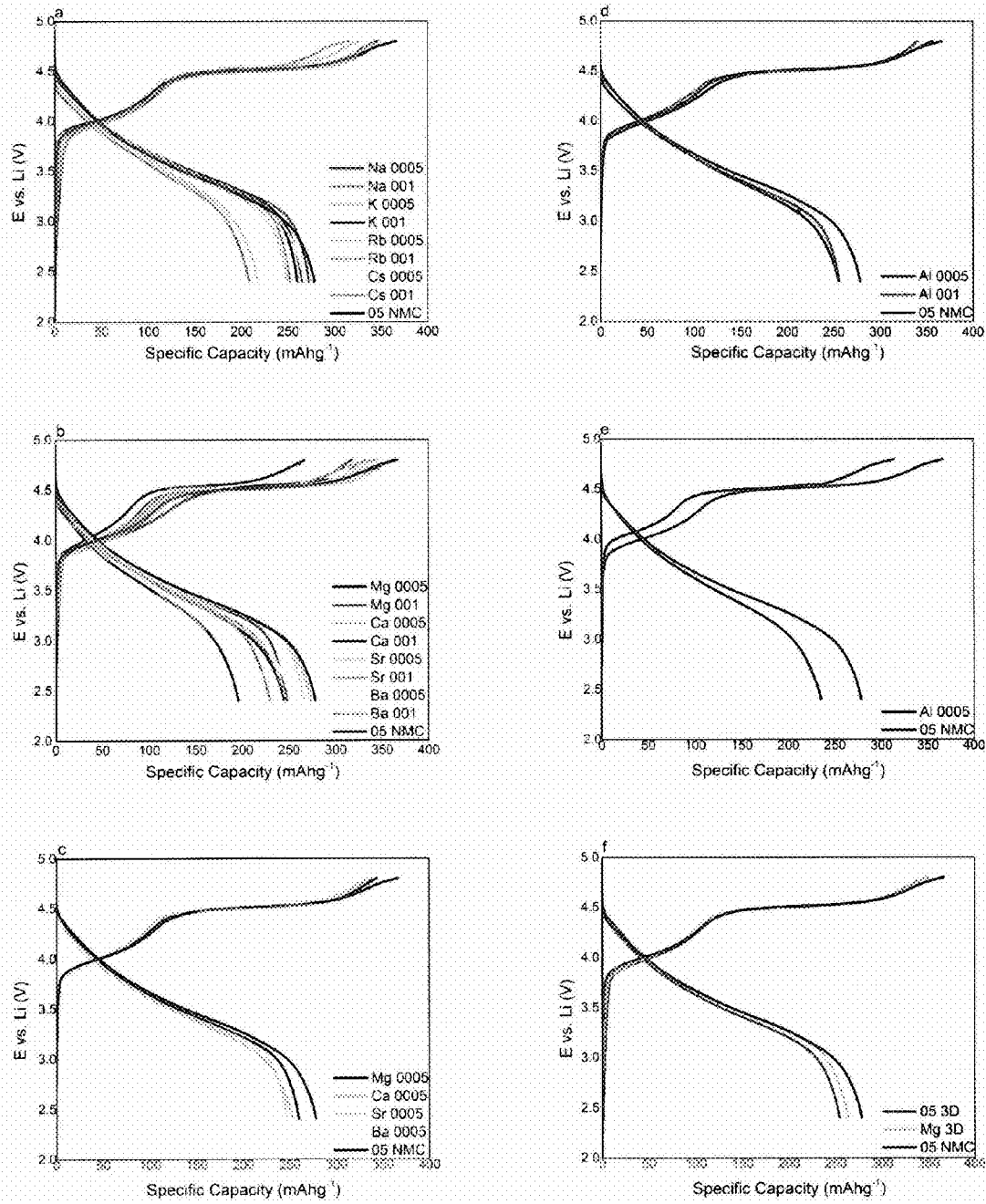
FIG. 17: Initial charge and discharge profiles at a constant current density of 10 $mAg^{-1}$ between 2.0 and 4.8 V for $Li_{1.2}Mn_{0.54}Ni_{0.13}Co_{0.13}O_2$ samples doped with typically 0.005 or 0.01 level of (a) Na, K, Rb or Cs substituting Li; (b) Mg, Ca, Sr or Ba substituting Co; (c) Mg, Ca, Sr or Ba substituting Ni; (d) Al substituting Mn; (e) Al substituting Ni; and (f) $Li_{1.2}Mn_{0.54}Ni_{0.13}Co_{0.13}O_2$ triply substituted with Na, Ba, Al indicated as "05 3D" or Na, Mg, Al indicated as "Mg 3D" at a total dopant level of 0.01 with equal distribution (0.01/3 for each) of dopant.
Figure 18:
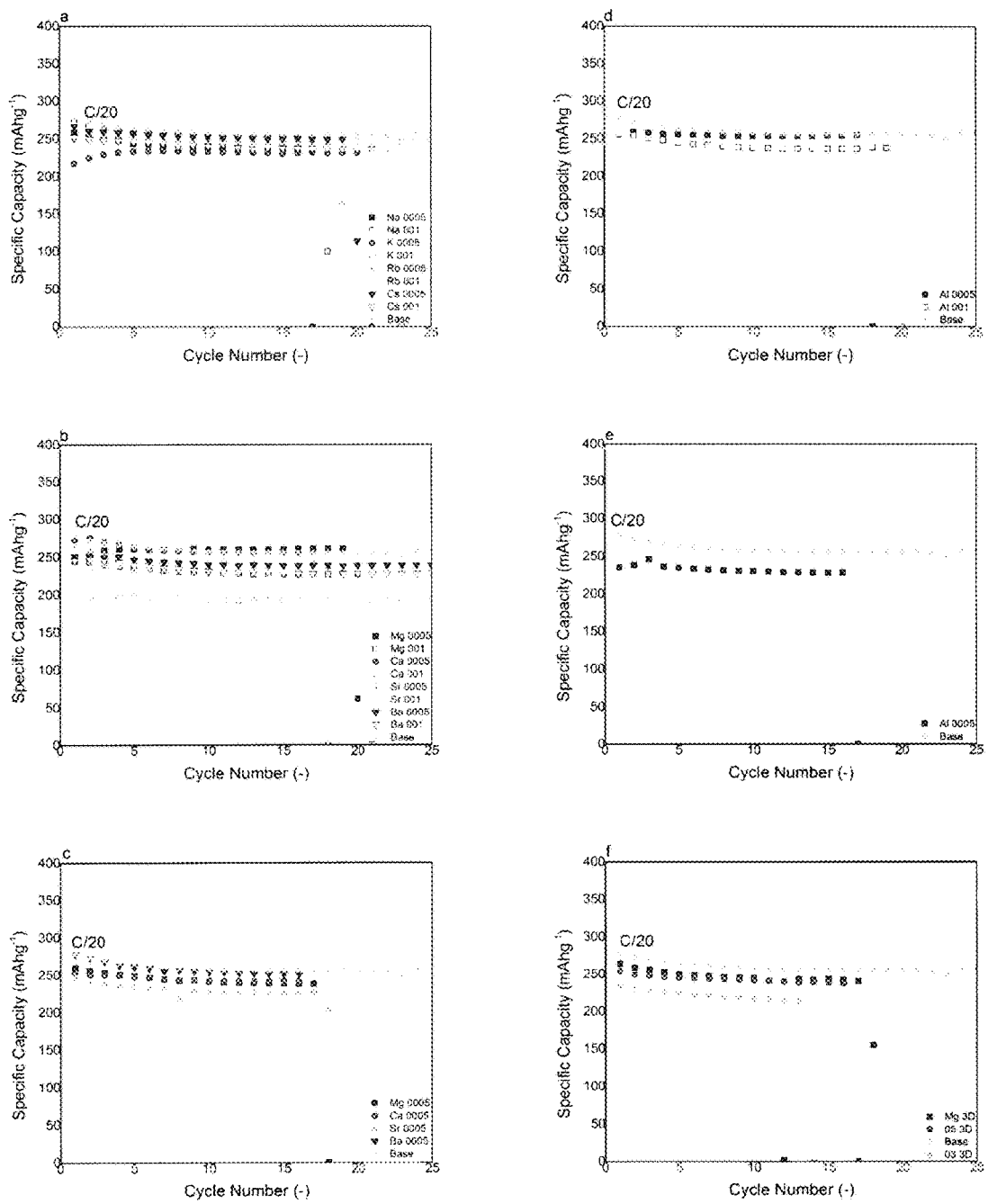
FIG. 18: Cycling performance of cells doped with (a) 0.005 or 0.01 levels of Na, K, Rb or Cs substituting Li; (b) 0.005 or 0.01 levels of Mg, Ca, Sr or Ba substituting Co; (c) 0.005 Mg, Ca, Sr or Ba substituting Ni; (d) 0.005 or 0.01 level of Al substituting Mn; (e) 0.005 level of Al substituting Ni; and (f) $Li_{1.2}Mn_{0.54}Ni_{0.13}Co_{0.13}O_2$ triply substituted with Na, Ba, Al indicated as "05 3D" or Na, Mg, Al indicated as "Mg 3D" at a total dopant level of 0.01 with equal distribution (0.01/3 for each) of dopant $Li_{1.14}Mn_{0.46}Ni_{0.2}Co_{0.2}O_2$ triply substituted with Na, Ba, Al indicated as "03 3D". The dopant free sample is added to all curves as a teal star for clarity.

To quantify voltage fade, we utilized our previously developed protocol to estimate the amount of fade in the samples. As it is clear from the results in Table 5, all samples synthesized via spray pyrolysis display overall favorable voltage fade compared to co-precipitation due to their superior purity (78). Certain dopants, or a combination of dopants successfully reduce the voltage fade of the samples further beyond the dopant free level. FIG. 17 shows the 1$^{st}$ cycle charge and discharge profile for the voltage fade related test samples, while FIG. 18 shows the cycle tests for the different materials. All samples display very stable cycling performance combined with low capacity fade, when cycled between 2.0-4.8V. Substitution of the same amount of dopant metal for different host atoms (e.g., alkaline earths for Ni/Co or Al for Mn/Ni) can show rather significant changes in the rate capability of the samples (Table 6). Especially when Al is substituted for Ni, the increase in the valence of the dopant significantly lowers the rate capability of the sample showing the central role of Ni in the electrochemical reaction in the cathode. Estimating capacity losses caused (Table 7) by the different dopants for Li or transitional metal ions, we observe greater losses than what could be anticipated (based upon the dopant level less than 1%, doping should not affect or reduce the capacity by more than 1%), and these are clearly beyond the reproducibility of spray pyrolysis (60).

dQ/dV curves of the samples are compared for cycle 2 and 100 in FIGS. 19-22 for different voltage windows and dopant levels. When cycled between 2.0-4.6 V, the alkali and alkaline earth metals display reduced spinel phase peaks, primarily during the charge, while developing better resolved peaks in the discharge curves at 100 cycles. Similar improvements can be obtained when a combination of dopants are used in different cathodes (FIG. 23). While certain level of stabilization via mitigating the phase change can be attained when the materials are cycled between 2.0-4.6 V, this will not be a solution for the 2.0-4.8 V voltage window.

Figure 19:
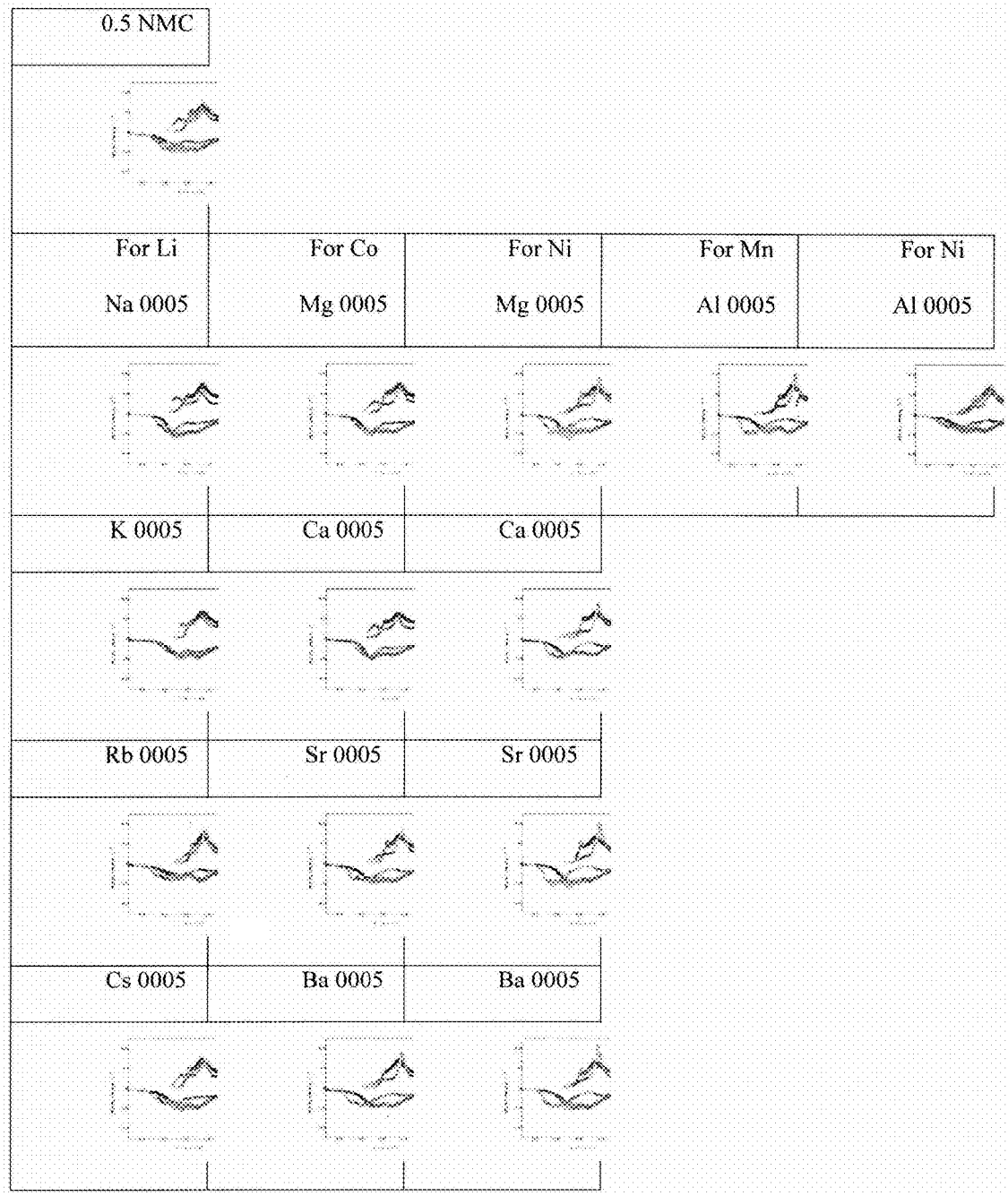
FIG. 19: dQ/dV curves of cycle 2 and cycle 100 of the doped samples when cycled at C/3 rate (66.67 $mAg^{-1}$) between 2.0-4.6 V, after the activation cycle. The curves are organized according to the position of the dopant element in the periodic table and above each curve the dopant is included. All dopant levels in the current table are fixed at 0.005.

Regarding FIG. 19, it is worth noting that when alkaline earth metals are substituted for Ni instead the spinel peak growth in the charge curves is more suppressed while the discharge peaks appear to be better resolved. When Al is substituted for Ni/Mn besides the improvement in the capacity retention (even though for Ni significantly affecting the actual capacities) both charge and discharge peaks are suppressed. Despite the ability of Al to improve capacity retention when substituted for Mn, Al does not appear to reduce the growth of the spinel charge peak that indicates voltage fade. This implies that Al doping improves capacity retention via a different mechanism, for example by reducing the strains along the c axis during cycling, as reported for several $LiMn_xO_y$ based spinel materials (71, 72).

Figure 20:
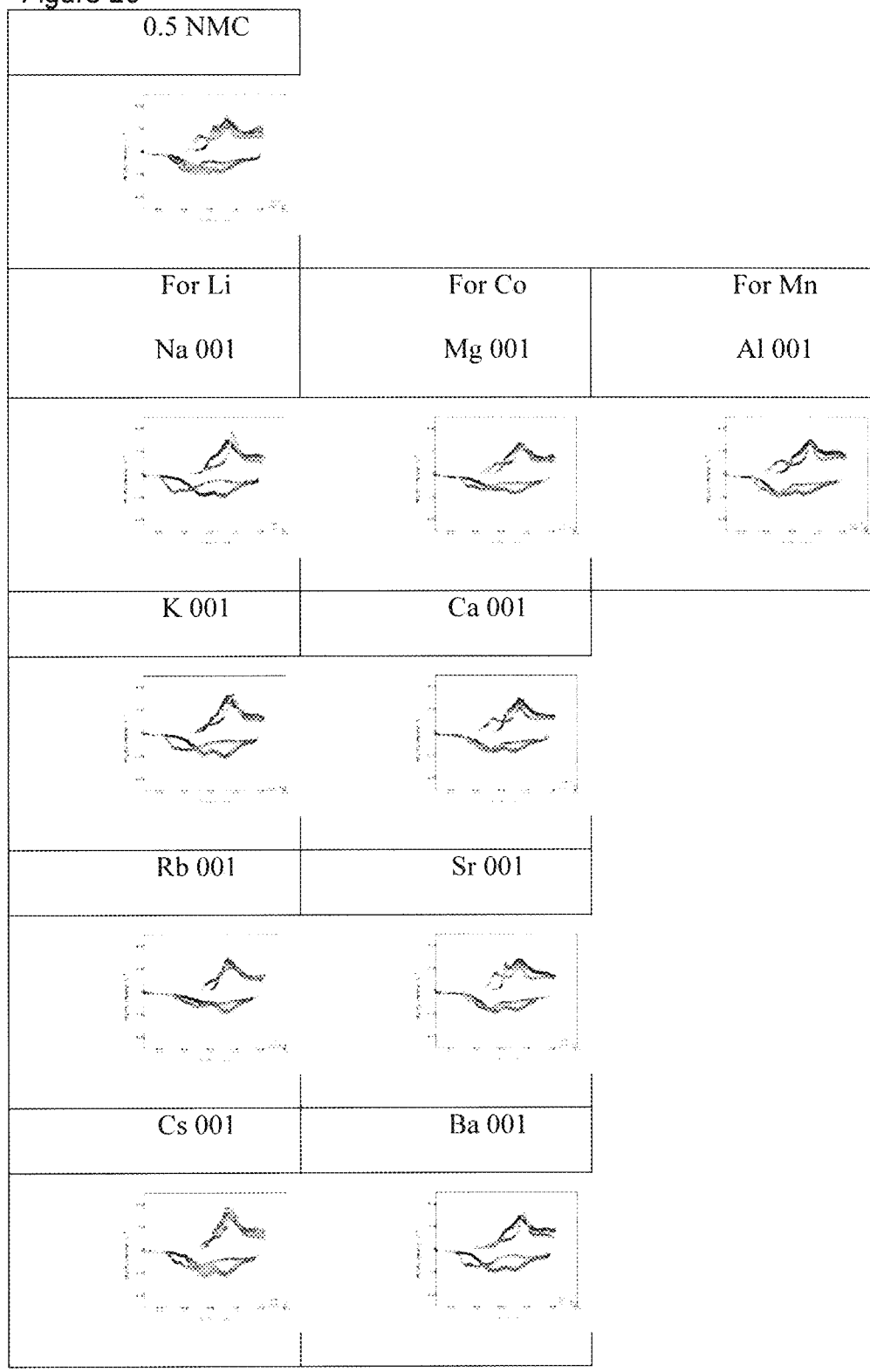
FIG. 20: dQ/dV curves of cycle 2 and cycle 100 of the doped samples when cycled at C/3 rate (66.67 $mAg^{-1}$) between 2.0-4.6 V, after the activation cycle. The curves are organized according to the position of the dopant element in the periodic table and above each curve the dopant is included. All dopant levels in the current table are fixed at 0.01.

Regarding FIG. 20, Ni-doping was omitted as the lower dopant level was effective. When compared to the results in FIG. 20 it is clear that doubling the dopant levels leads to more significant suppression of the spinel peaks in the charge curves for the alkali and alkaline earth metals. Increasing the Al dopant's level for Mn however seems to lead to additional new peaks forming in the structure.

Figure 21:
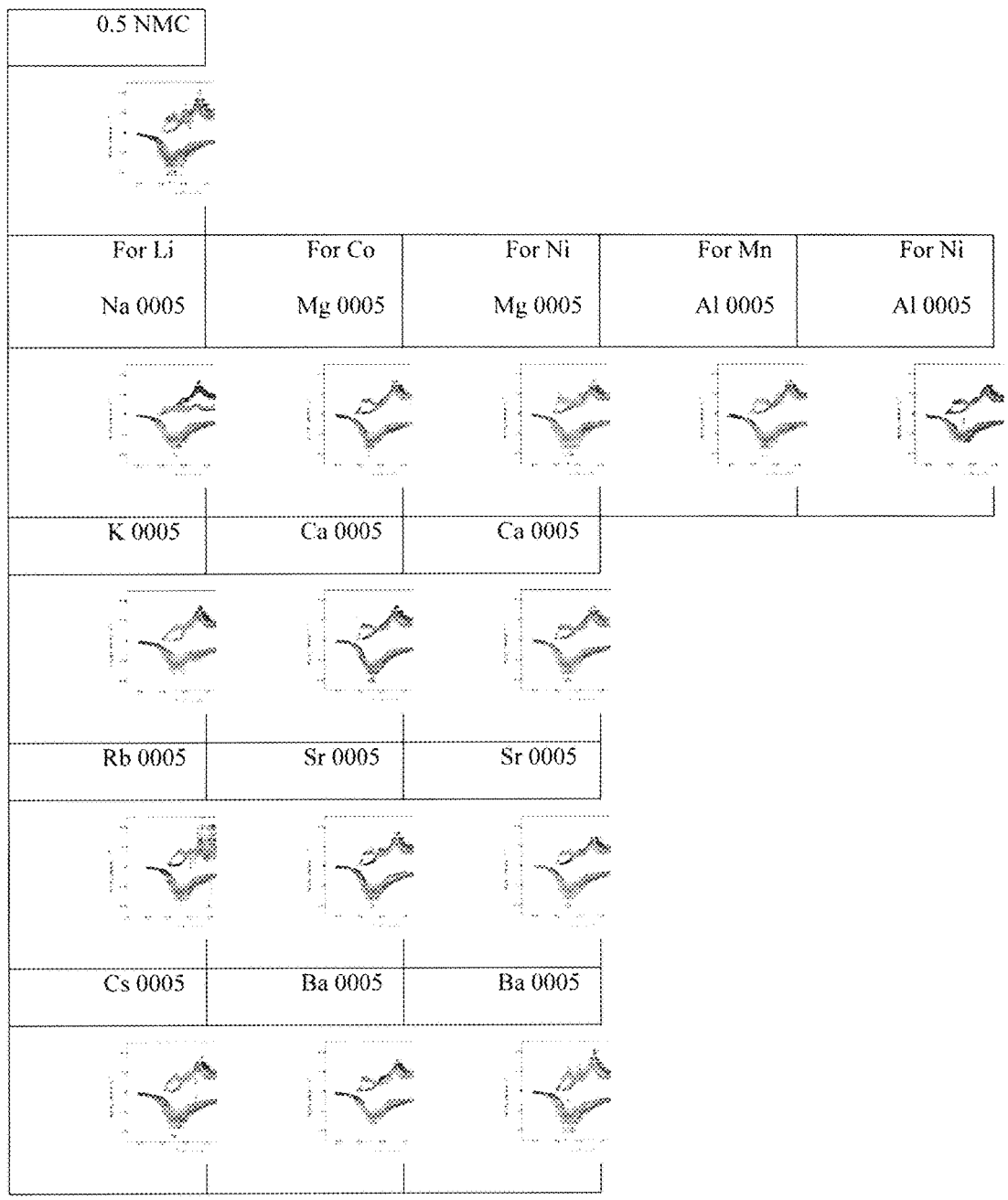
FIG. 21: dQ/dV curves of cycle 2 and cycle 16 of the doped samples when cycled at C/20 rate (10 $mAg^{-1}$) between 2.0-4.8 V. The curves are organized according to the position of the dopant element in the periodic table and above each curve the dopant is included. All dopant levels in the current table are fixed at 0.005.

Regarding FIG. 21, while improvements can be observed when cycled between 2.0-4.6 V, the dopants have minor effect on the spinel peak growth and peak shift. Additionally, it is clear that all samples still display the original 4.6 V activation peak in the charge profiles at these low currents in cycle 2, which disappears gradually by cycle 16. Similar trends were reported before by Yabuuchi et al. (5) for 0.5 NMC, but it is a rather surprising find for the doped samples.

Figure 22:
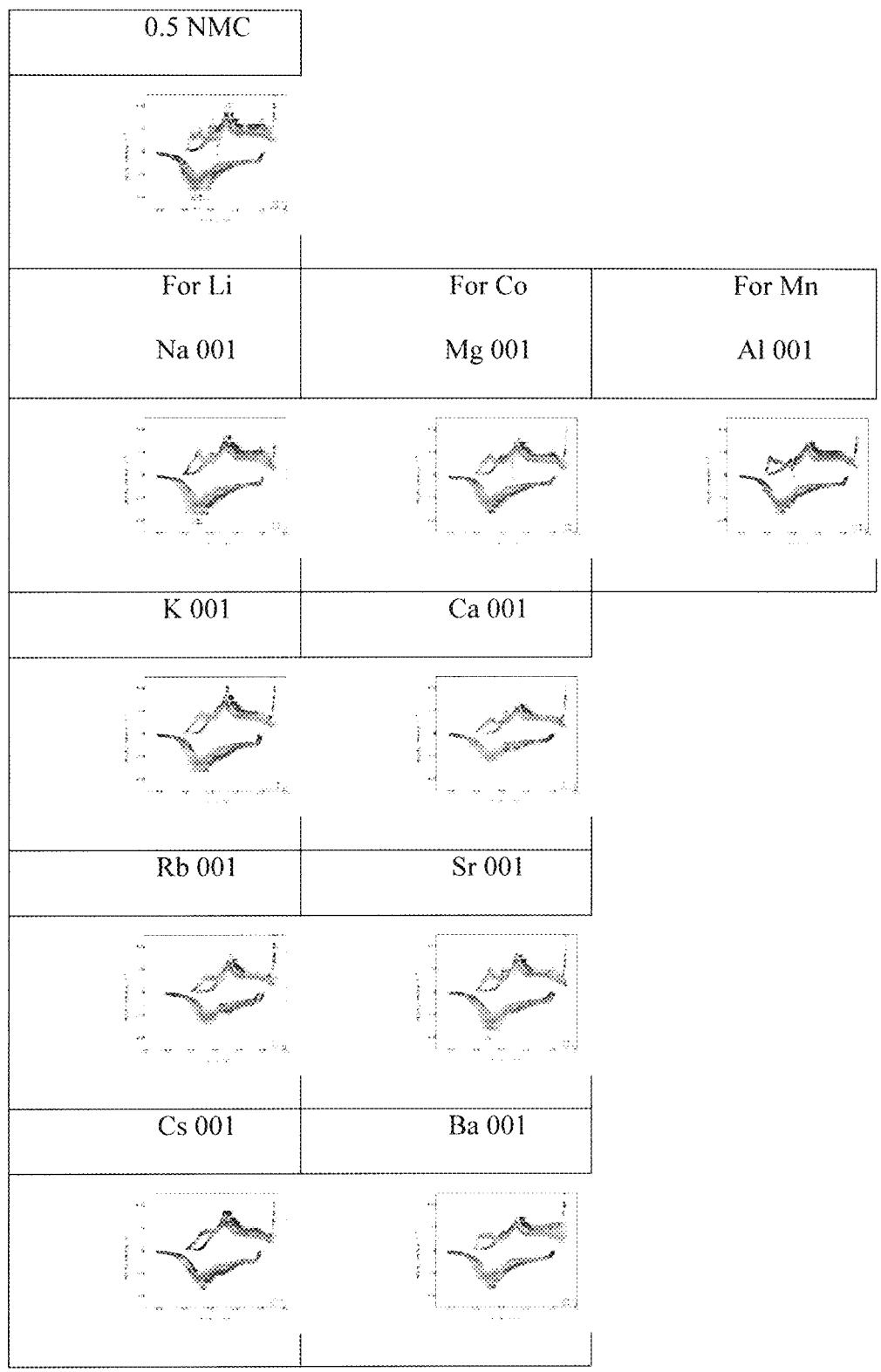
FIG. 22: dQ/dV curves of cycle 2 and cycle 16 of the doped samples when cycled at C/20 rate (10 $mAg^{-1}$)

FIG. 22: dQ/dV curves of cycle 2 and cycle 16 of the doped samples when cycled at C/20 rate (10 $mAg^{-1}$) between 2.0-4.8 V. The curves are organized according to the position of the dopant element in the periodic table and above each curve the dopant is included. All dopant levels in the current table are fixed at 0.01.

Regarding FIG. 23, the effects of the annealing temperature on these compositions via spray pyrolysis were reported earlier (29). Several earlier reports (29, 18, 24) experimentally observed that a reduction in the $Li_2MnO_3$ content of the materials leads to reduced voltage fade and these studies identified this structural component as a major contributor leading to the voltage fade of the layered chemistry (28, 30, 19). With this in mind, we evaluated the effect of a combination of dopants on $xLi_2MnO_3 \cdot (1-x) Li(Ni_{1/3}Mn_{1/3}Co_{1/3})O_2$ chemistries, where $x \leq 0.5$, with the understanding that samples with lower x are expected to be more easily stabilized. Since, as noted above, both alkali and alkaline earth doping affected the new peaks arising in the dQ/dV curves throughout the charge cycling, and Al doping significantly improved the capacity retention, so, Na, Al and Ba triple-doped samples were selected to be synthesized. FIG. 23 compares the dQ/dV curves of the dopant-free and triple-doped $Li_{1.09}Mn_{0.43}Ni_{0.24}Co_{0.24}O_2$, $Li_{1.14}Mn_{0.46}Ni_{0.2}Co_{0.2}O_2$ and $Li_{1.2}Mn_{0.54}Ni_{0.13}Co_{0.13}O_2$ samples for cycles 1 and 100. All four materials display some improvements compared to the dopant-free materials, and less spinel phase evolution both in their charge and discharge profiles, especially with originally lower x in composition.

Electrochemical Impedance Testing Results

Figure 11:
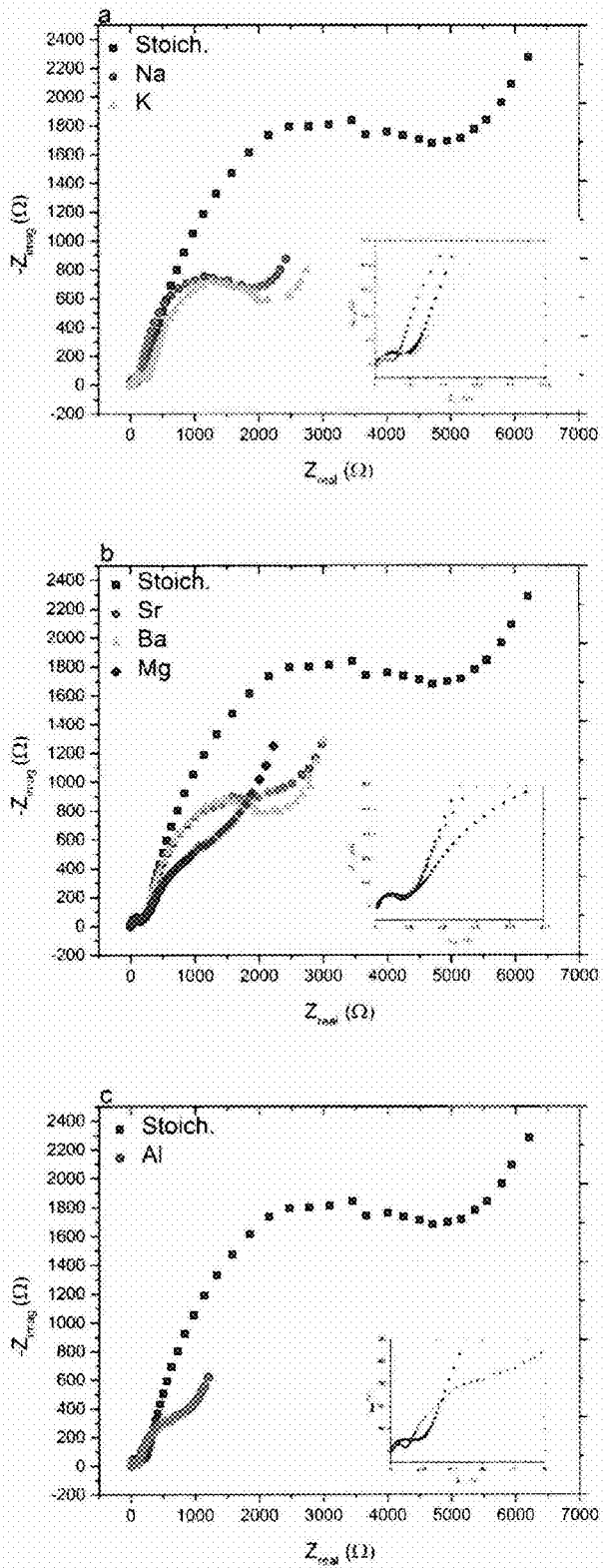
FIG. 11: Nyquist plots of the $Li/Li_{1.2}Ni_{0.13}Co_{0.13}Mn_{0.54}O_2$ cells measured between 2.0 V and 4.6 V of cells after 30 cycles and in a discharged state for (a) Na 0.01 and K 0.01; (b) Mg 0.01, Sr 0.01 and Ba 0.01; and (c) Al. The insets show the shape of the first semicircles. The AC amplitude was 5 mV and scan frequency was in the range of $0.02-1.0\times10^5$ Hz.
Figure 12:
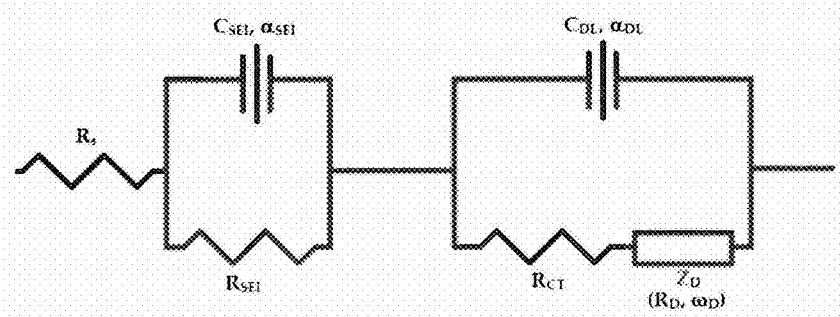
FIG. 12: The equivalent circuit model used for the interpretation of the EIS spectra.

EIS spectra of single doped $Li_{1.2}Mn_{0.54}Ni_{0.13}Co_{0.13}O_2$ cells were recorded after 30 cycles tested with a voltage fade protocol reported in the literature (22). Examples of Na, K, Al, Mg, Sr and Ba doped results are displayed in FIG. 11 and the insets show the amplified first semi-circle. FIG. 12 shows the equivalent circuit model that was applied to analyze the data. The equivalent circuit model contained (i) resistance from the electrolyte, $R_s$; (ii) solid electrolyte interface resistance, $R_{SEI}$; (iii) the capacitance of the SEI layer, $C_{SEI}$ with a non-ideality factor $\alpha_{SEI}$; (iv) charge transfer $R_{ct}$ at the surface film particle bulk interface; (v) double-layer capacitance, $C_{DL}$ with a non-ideality factor $\alpha_{DL}$; and (vi) a resistance coefficient and its characteristic frequency for diffusion/Warburg impedance $R_D$ and $\omega_D$. The results clearly indicate that any doping significantly improves the conductivity of these cells. The high impedance of the dopant-free samples is speculated to be the result of the high purity synthesis method.

Table 4a and b show the capacity of selected doped samples of $Li_{1.2}Mn_{0.54}Ni_{0.13}Co_{0.13}O_2$ with a dopant level of (a) 0.005 and (b) 0.01. 05 3D and Mg 3D stand for a triple doped sample of $Li_{1.2}Mn_{0.54}Ni_{0.13}Co_{0.13}O_2$ with Na, Ba and Al and Na, Mg and Al substituted in a total concentration of 0.01, respectively.

TABLE 4a

|  | Part 1 Capacity $mAhg^{-1}$ | Part 2 Capacity $mAhg^{-1}$ | Total Capacity $mAhg^{-1}$ |
| --- | --- | --- | --- |
| Theoretical 05 NMC | 138.9 | 229 | 367.9 |
| Base | 132 | 225 | 357 |
| Na | 130 | 207 | 337 |
| K | 130 | 194 | 324 |
| Rb | 130 | 185 | 315 |
| Cs | 130 | 203 | 333 |
| Al | 132 | 195 | 327 |
| Mg | 150 | 196 | 346 |
| Ca | 130 | 202 | 332 |
| Sr | 125 | 209 | 334 |
| Ba | 132 | 198 | 330 |

TABLE 4b

|  | Part 1 Capacity $mAhg^{-1}$ | Part 2 Capacity $mAhg^{-1}$ | Total Capacity $mAhg^{-1}$ |
| --- | --- | --- | --- |
| Theoretical 05 NMC | 138.9 | 229 | 367.9 |
| Base | 132 | 225 | 357 |
| Na | 130 | 186 | 316 |
| K | 130 | 193 | 323 |
| Rb | 130 | 170 | 300 |
| Cs | 130 | 222 | 352 |
| Al | 128 | 209 | 337 |
| Mg | 110 | 211 | 321 |
| Ca | 100 | 216 | 316 |
| Sr | 130 | 202 | 332 |
| Ba | 120 | 217 | 337 |
| 05 3D | 128 | 220 | 348 |
| Mg 3D | 128 | 221 | 349 |

Table 5 shows a numerical amount of voltage fade in the samples bases upon cycle 1 and 16 obtained at a constant current density of 10 $mAg^{-1}$ between 2.4 and 4.8 V for the samples studied. The numbers (0005/001) refer to the different dopant levels, 05 NMC refers to the $Li_{1.2}Mn_{0.54}Ni_{0.13}Co_{0.13}O_2$ composition, and "co-precip." refers to the results obtained for the $Li_{1.2}Mn_{0.55}Ni_{0.15}Co_{0.1}O_2$ sample as published by Mohanty et al. (19) and reported earlier (29). 05 3D refers to $Li_{1.2}Mn_{0.54}Ni_{0.13}Co_{0.13}O_2$ triple doped with Na, Al and Ba, while Mg 3D refers to $Li_{1.2}Mn_{0.54}Ni_{0.13}Co_{0.13}O_2$ triple doped with Na, Al and Mg. The spray pyrolyzed samples were cycled between 2.4-4.8 V at a current density of 10 $mAg^{-1}$ using 1.0 M $LiPF_6$ in EC:DEC:DMC 1:1:1 electrolyte. The voltage fade was quantified based upon the differences in the area under the respective charge and discharge curves for cycle 1 and 16, as reported earlier (29).

TABLE 5

| For Li | | Na 0005 | K 0005 | Rb 0005 | Cs 0005 | Na 001 | K 001 | Rb 001 | Cs 001 |
|---|---|---|---|---|---|---|---|---|---|
| Cycles 1-16 | Charge | 0.032 | 0.031 | 0.031 | 0.032 | 0.030 | 0.033 | 0.029 | 0.030 |
| | Discharge | 0.004 | 0.002 | 0.003 | 0.003 | 0.006 | 0.004 | 0.000 | 0.005 |

| For Co | | Mg 0005 | Ca 0005 | Sr 0005 | Ba 0005 | Mg 001 | Ca 001 | Sr 0001 | Ba 001 |
|---|---|---|---|---|---|---|---|---|---|
| Cycles 1-16 | Charge | 0.031 | 0.033 | 0.032 | 0.030 | 0.033 | 0.031 | 0.029 | 0.032 |
| | Discharge | 0.001 | 0.001 | 0.004 | 0.002 | 0.006 | 0.002 | 0.001 | 0.003 |

| | | For Mn Al 0005 | For Mn Al 001 | 05 3D | Mg 3D | 05 NMC | Co-precip. |
|---|---|---|---|---|---|---|---|
| Cycles 1-16 | Charge | 0.030 | 0.031 | 0.030 | 0.031 | 0.031 | 0.031 |
| | Discharge | 0.000 | 0.002 | 0.003 | 0.004 | 0.004 | 0.011 |

| Ni-sub | | Mg 0005 | Ca 0005 | Sr 0005 | Ba 0005 | Al 0005 |
|---|---|---|---|---|---|---|
| Cycles 1-16 | Charge | 0.032 | 0.032 | 0.033 | 0.032 | 0.036 |
| | Discharge | 0.003 | 0.001 | 0.003 | 0.006 | 0.003 |

Table 6 is a comparison of the effect of different dopants on the rate capability of the doped samples at identical dopant levels and current densities. When Ni is substituted with aluminum vs. Mn substitution the rate capability is inferior at any rate. For alkaline earth dopants replacing Ni instead of Co lowers the rate capability of the material, particularly at higher current densities and C-rates.

TABLE 6

| | Cycle 1 @ C/20 | Cycle 1 @ C/10 | Cycle 1 @ C/5 | Cycle 1 @ C/2 | Cycle 1 @ C/1 |
|---|---|---|---|---|---|
| Al 0005 | 255.4 | 244.6 | 215.4 | 187.8 | 165.7 |
| Ni—Al | 235.1 | 217.0 | 180.9 | 156.1 | 133.3 |
| % Change For Mn—Ni | 108.6 | 112.7 | 119.1 | 120.3 | 124.3 |
| Mg 0005 | 244.6 | 235.7 | 210.6 | 188.3 | 171.9 |
| Ni—Mg | 259.9 | 262.6 | 215.2 | 184.4 | 161.2 |

TABLE 6-continued

| | Cycle 1 @ C/20 | Cycle 1 @ C/10 | Cycle 1 @ C/5 | Cycle 1 @ C/2 | Cycle 1 @ C/1 |
|---|---|---|---|---|---|
| % Change For Co—Ni | 94.1 | 89.8 | 97.8 | 102.1 | 106.6 |
| Ca 0005 | 273.2 | 224.6 | 197.7 | 172.9 | 153.9 |
| Ni—Ca | 252.9 | 250.6 | 206.5 | 174.5 | 153.6 |
| % Change For Co—Ni | 108.0 | 89.6 | 95.8 | 99.1 | 100.2 |
| Sr 0005 | 266.0 | 262.8 | 217.3 | 187.7 | 161.5 |
| Ni—Sr | 246.8 | 242.6 | 204.2 | 176.0 | 154.6 |
| % Change For Co—Ni | 107.8 | 108.3 | 106.4 | 106.7 | 104.5 |
| Ba 0005 | 251.4 | 263.7 | 214.9 | 183.3 | 166.2 |
| Ni—Ba | 277.5 | 254.6 | 212.0 | 181.2 | 158.1 |
| % Change For Co—Ni | 90.6 | 103.5 | 101.4 | 101.2 | 105.1 |

Table 7 (a) is data for observed first cycle charge and discharge capacity. Table 7 shows a % capacity lost compared to dopant-free sample.

TABLE 7a

| For Li | | Na 0005 | K 0005 | Rb 0005 | Cs 0005 | Na 001 | K 001 | Rb 001 | Cs 001 |
|---|---|---|---|---|---|---|---|---|---|
| Cycles 1 (mAhg⁻¹) | Charge | 337.2 | 324.5 | 316.0 | 333.0 | 316.7 | 323.5 | 300.9 | 352.7 |
| | Discharge | 261.5 | 226.5 | 210.2 | 247.8 | 232.2 | 233.2 | 184.6 | 252.0 |

| For Co | | Mg 0005 | Ca 0005 | Sr 0005 | Ba 0005 | Mg 001 | Ca 001 | Sr 001 | Ba 001 |
|---|---|---|---|---|---|---|---|---|---|
| Cycles 1 (mAhg⁻¹) | Charge | 346.8 | 332.4 | 334.3 | 330.2 | 321.3 | 316.2 | 332.8 | 337.3 |
| | Discharge | 264.6 | 240.8 | 243.2 | 242.2 | 226.4 | 226.8 | 228.9 | 241.3 |

| | | For Mn Al 0005 | For Mn Al 001 | 05 3D | Mg 3D | 03 NMC | 03 3D NMC | 0.5 NMC |
|---|---|---|---|---|---|---|---|---|
| Cycles 1 (mAhg⁻¹) | Charge | 327.1 | 338.0 | 340.4 | 370.1 | 328.9 | 309.0 | 356.5 |
| | Discharge | 233.4 | 243.3 | 257.4 | 296.9 | 233.9 | 228.8 | 271.5 |

| Ni-sub | | Mg 0005 | Ca 0005 | Sr 0005 | Ba 0005 | Al 0005 |
|---|---|---|---|---|---|---|
| Cycles 1 (mAhg⁻¹) | Charge | 337.6 | 312.9 | 318.1 | 319.0 | 290.7 |
| | Discharge | 257.4 | 228.0 | 239.4 | 241.2 | 221.9 |

TABLE 7b

| For Li | Na 0005 | K 0005 | Rb 0005 | Cs 0005 | Na 001 | K 001 | Rb 001 | Cs 001 |
|---|---|---|---|---|---|---|---|---|
| Cycles 1 Charge | 5.4 | 9.0 | 11.4 | 6.6 | 11.2 | 9.3 | 15.6 | 1.1 |
| Discharge | 3.7 | 16.6 | 22.6 | 8.7 | 14.5 | 14.1 | 32.0 | 7.2 |
| For Co | Mg 0005 | Ca 0005 | Sr 0005 | Ba 0005 | Mg 001 | Ca 001 | Sr 001 | Ba 001 |
| Cycles 1 Charge | 2.7 | 6.8 | 6.2 | 7.4 | 9.9 | 11.3 | 6.7 | 5.4 |
| Discharge | 2.5 | 11.3 | 10.4 | 10.8 | 16.6 | 16.5 | 15.7 | 11.1 |

| | For Mn Al 0005 | For Mn Al 001 | 05 3D | Mg 3D | 03 3D NMC | 0.5 NMC |
|---|---|---|---|---|---|---|
| Cycles 1 Charge | 8.3 | 5.2 | 4.5 | 0.0 | 6.0 | 0 |
| Discharge | 14.0 | 10.4 | 5.2 | 0.0 | 2.2 | 0 |

| Ni-sub | Mg 0005 | Ca 0005 | Sr 0005 | Ba 0005 | Al 0005 |
|---|---|---|---|---|---|
| Cycles 1 Charge | 5.3 | 12.2 | 10.8 | 10.5 | 18.5 |
| Discharge | 5.2 | 16.0 | 11.8 | 11.1 | 18.3 |

CONCLUSIONS

Layered lithium battery cathode materials were synthesized via spray pyrolysis. By taking advantage of the unique ability of spray pyrolysis to control impurities to small levels, inexpensive alkali, alkaline earth and aluminum dopants were tested to improve the capacity retention and voltage fade of the layered materials. Alkali and alkaline earth metals were found to reduce the new phase formation either during the charge or the discharge profiles while on some occasions leading to additional phase formation and thus affect voltage fade, while aluminum doping improves capacity fade. Alkali dopants are speculated to improve the voltage fade primarily via steric effects as these dopants are unlikely to be intercalated during charge discharge testing. Alkaline earth metals are speculated to increase the average oxidation state of transitional metal ions in the sample and thus improve voltage fade. Samples triple-doped with Na, Ba and Al displayed less voltage fade character in their charge and discharge voltage curves after 100 cycles compared to pristine materials and the multidoping mitigated the unwanted structural changes in the sample. Although voltage fade was not completely overcome in the current study, it is anticipated that further improvements can be obtained by adjusting individual dopant levels.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

REFERENCES

1. Kim J-S, Johnson C S, Vaughey J T, Thackeray M M, Hackney S A, Yoon W, et al. Electrochemical and Structural Properties of $xLi2M'O3 \cdot (1-x)LiMn0.5Ni0.5O2$ Electrodes for Lithium Batteries (M'=Ti, Mn, Zr 0<x<0.3). Chem Mater. 2004; 16:1996-2006.
2. Johnson C S, Li N, Lefief C, Thackeray M M. Anomalous capacity and cycling stability of $xLi_2MnO_3 \cdot (1-x)LiMO_2$ electrodes (M=Mn, Ni, Co) in lithium batteries at 50° C. Electrochem Comm. 2007; 9:787-95.
3. Johnson C S, Li N, Lefief C, Vaughey J T, Thackeray M M. Synthesis, Characterization and Electrochemistry of Lithium Battery Electrodes: $xLi_2MnO_3 \cdot (1-x)LiMn_{0.333}Ni_{0.333}Co_{0.333}O_2$ (0≤x≤0.7). Chem Mater. 2008; 20:6095-106.
4. McCalla E, Rowe A W, Camardese J, Dahn J R. The Role of Metal Site Vacancies in Promoting Li—Mn—Ni—O Layered Solid Solutions. Chem Mater. 2013; 25:2716-21.
5. Yabuuchi N, Yoshii K, Myung S-T, Nakai I, Komaba S. Detailed Studies of a High-Capacity Electrode Material for Rechargeable Batteries, $Li_2MnO_3$—$LiCo_{1/3}Ni_{1/3}Mn_{1/3}O_2$. J Am Chem Soc. 2011; 133:4404-19.
6. Gu M, Belharouak I, Zheng J, Wu H, Xiao J, Genc A, et al. Formation of the Spinel Phase in the Layered Composite Cathode Used in Li-Ion Batteries. ACS Nano. 2012; 7(1):760-7.
7. Liu J, Chen L, Hou M, Wang F, Che R, Xia Y. General synthesis of $xLi2MnO3(1-x)LiMn_{1/3}Ni_{1/3}Co_{1/3}O2$ nanomaterials by a molten-salt method: towards a high capacity and high power cathode for rechargeable lithium batteries. J Mater Chem. 2012; 22:25380-7.
8. Fell C R, Caroll K J, Chi M, Meng Y S. Synthesis-Structure-Property Relations in Layered, "Li-excess" Oxides Electrode Materials $Li[Li_{1/3-2x/3}Ni_xMn_{2/3-x/3}]O2$ (x=⅓, ¼, and ⅕). J Electrochem Soc. 2010; 157(11): A1202-A11.
9. Cabana J, Johnson C S, Yang X-Q, Chung K-Y, Yoon W-S, Kang S-H, et al. Structural complexity of layered-spinel composite electrodes for Li-ion batteries. J Mater Res. 2010; 25(8):1601.
10. Wu Y, Manthiram A. High Capacity, Surface-Modified Layered $(Li[Li(1-x)/3Mn(2-x)/3Ni_{x/3}Co_{x/3}]O2$ cathodes with Low Irreversible Capacity Loss. J Electrochem Soc. 2006; 9(5):A221-A4.
11. Gao J, Manthiram A. Eliminating the irreversible capacity loss of high capacity layered $Li[Li_{0.2}Mn_{0.54}Ni_{0.13}Co_{0.13}]O_2$ cathode by blending with other lithium insertion hosts. J Power Sources. 2009; 191:644-7.

12. Manthiram A. Materials Challenges and Opportunities of Lithium Ion Batteries. J Phys Chem Lett. 2011; 2:176-84.
13. Yu H, Kim H, Wang Y, He P, Asakura D, Nakamura Y, et al. High-energy 'composite' layered manganese-rich cathode materials via controlling Li2MnO3 phase activation for lithium-ion batteries. Phys Chem Chem Phys. 2012; 14:6584-95.
14. Hong J, Lim H-D, Lee M, Kim S-W, Kim H, Oh S-T, et al. Critical Role of Oxygen Evolved from Layered Li-Excess Metal Oxides in Lithium Rechargeable Batteries. Chem Mater. 2012; 24:2692-7.
15. Ghanty C, Basu R N, Majumder S B. Electrochemical performances of 0.9Li2MnO3-0.1Li(Mn0.375Ni0.375Co0.25)O2 cathodes Role of the cycling induced layered to spinel phase transformation. Solid State Ionics. 2014; 256:19-28.
16. Wang Y, Bie X, Nikolowski K, Ehrenberg H, Du F, Hinterstein M, et al. Relationships between Structural Changes and Electrochemical Kinetics of Li-Excess Li1.13Ni0.3Mn0.57O2 during the First Charge. J Phys Chem C. 2013; 117:3279-86.
17. Simonin L, Colin J-F, Ranieri V, Canévet E, Martin J-F, Bourbon C, et al. In situ investigations of a Li-rich Mn—Ni layered oxide for Li-ion batteries. J Mater Chem. 2012; 22:11316.
18. Croy J R, Gallagher K G, Balasubramanian M, Chen Z, Ren Y, Kim D, et al. Examining Hysteresis in Composite xLi2MnO3.(1−x)LiMO2 Cathode Structures. J Phys Chem C. 2013; 117:6525-36.
19. Mohanty D, Kalnaus S, Meisner R A, Rhodes K J, Li J, Payzant E A, et al. Structural transformation of a lithium-rich Li1.2Co0.1Mn0.55Ni0.15O2 cathode during high voltage cycling resolved by in situ X-ray diffraction. J Power Sources. 2013; 229(1):239-48.
20. Mohanty D, Kalnaus S, Meisner R A, Safat A S, Li J, Payzant E A, et al. Structural transformation in a Li1.2Co0.1Mn0.55Ni0.15O2 lithium-ion battery cathode during high-voltage hold. RSC Advances. 2013; 3:7479.
21. Mohanty D, Sefat A S, Ku J, Meisner R A, Rondidone A J, Payzant E A, et al. Correlating cation ordering and voltage fade in a lithiummanganese-rich lithium-ion battery cathode oxide: a joint magnetic susceptibility and TEM study. Phys Chem Chem Phys. 2013; 15:19496.
22. Mohanty D, Huq A, Payzant E A, Sefat A S, Li J, Abraham D P, et al. Neutron Diffraction and Magnetic Susceptibility Studies on a High-Voltage Li1.2Mn0.55Ni0.15Co0.10O2 Lithium Ion Battery Cathode: Insight into the Crystal Structure. Chem Mater. 2013; 25:4064-70.
23. Gu M, Genc A, Belharouak I, Wang D, Amine K, Thevuthasan S, et al. Nanoscale Phase Separation, Cation Ordering, and Surface Chemistry in Pristine Li1.2Ni0.2Mn0.6O2 for Li-Ion Batteries. Chem Mater. 2013; 25:2319-26.
24. Li Y, Bettge M, Polzin B, Zhu Y, Balasubramanian M, Abraham D P. Understanding Long-Term Cycling Performance of Li1.2Ni0.15Mn0.55Co0.1O2 Lithium-Ion Cells. J Electrochem Soc. 2013; 160(5):A3006-A19.
25. Yu S-H, Yoon T, Mun J, Park S, Kang Y-S, Park J-H, et al. Continuous activation of Li2MnO3 component upon cycling in Li1.167Ni0.233Co0.100Mn0.467Mo0.033O2 cathode material for lithium ion batteries. J Mater Chem A. 2013; 1:2833.
26. Bloom I, Trahey L, Abouimrane A, Belharouak I, Zhang X, Wu Q, et al. Effect of interface modifications on voltage fade in 0.5Li2MnO3 0.5LiNi0.375Mn0.375Co0.25O2 cathode materials. J Power Sources. 2014; 249:509-14.
27. Sathiya M, Rousse G, Ramesha K, Laisa C P, Vezin H, Sougrati M T, et al. Reversible anionic redox chemistry in high-capacity layered-oxide electrodes. Nat Mater. 2013; 12.
28. Lee E-S, Manthiram A. Smart design of lithium-rich layered oxide cathode compositions with suppressed voltage decay. J Mater Chem A. 2014; 2:3932.
29. Lengyel M, Zhang X, Atlas G, Bretscher H L, Belharouak I, Axelbaum R L. Composition Optimization of Layered Lithium Nickel Manganese Cobalt Oxide Materials Synthesized Via Ultrasonic Spray Pyrolysis. J Electrochem Soc. 2014, 161 (9): A1338-A1349.
30. Zhang X, Lengyel M, Axelbaum R L. Nanostructured High-Energy xLi2MnO3.(1−x)LiNi0.5Mn0.5O2 (0.3≤x≤0.6) Cathode Materials. AlChE J. 2014; 60(2): 443-50.
31. Lengyel M, Atlas G, Elhassid D, Zhang X, Belharouak I, Axelbaum R L. Effects of surface area and lithium content on the electrochemical performance of Li1.2Mn0.54Ni0.13Co0.13O2 2014.
32. Son M Y, Hong Y J, Choi S H, Kang Y C. Effects of ratios of Li2MnO3 and Li(Ni13Mn13Co13)O2 phases on the properties of composite cathode powders in spray pyrolysis. Electrochim Acta. 2013; 103.
33. Liu J, Liu J, Wang R, Xia Y. Degradation and Structural Evolution of xLi2MnO3.(1x)LiMn⅓Ni⅓Co⅓O2 during Cycling. J Electrochem Soc. 2014; 161(1):A160-A7.
34. Wang H, Tan T A, Yang P, Lai M O, Lu L. High-Rate Performances of the Ru-Doped Spinel LiNi0.5Mn1.5O4: Effects of Doping and Particle Size. J Phys Chem C. 2011; 115:6102-10.
35. Luo W, Zhou F, Zhao X, Lu Z, Li X, Dahn J R. Synthesis, Characterization and Thermal Stability of LiNi⅓Mn⅓Co⅓-zMgzO2, LiNi⅓-zMn⅓Co⅓MgzO2 and LiNi⅓Mn⅓-zCo⅓MgzO2. Chem Mater. 2010; 22:1164-72.
36. Pouillerie C, Perton F, Biensan P, Péres J P, Broussely M, Delmas C. Effect of Magnesium substitution on the cycling behavior of lithium nickel cobalt oxide. J Power Sources. 2001; 96:293-302.
37. Chowdari B V R, Rao G V S, Chow S Y. Cathodic behavior of (Co, Ti, Mg)-doped LiNiO2. Solid State Ionics. 2001; 140:55-62.
38. Lee D K, Han S C, Ahn D, Singh S P, Sohn K-S, Pyo M. Suppression of Phase Transition in LiTb0.01Mn1.99O4 Cathodes with Fast Li+Diffusion. ACS Appl Mater Interfaces. 2012; 4:6842-8.
39. Tavakoli A H, Kondo H, Ukyo Y, Navrotsky A. Stabilizing Effect of Mg on the Energetics of the Li(Ni,Co,Al)O2 Cathode Material for Lithium Ion Batteries. J Electrochem Soc. 2013; 160(2):A302-A5.
40. Zhou W-J, He B-L, Li H-L. Synthesis, structure and electrochemistry of Ag-modified LiMn2O4 cathode materials for lithium-ion batteries. Mat Res Bull. 2008; 43:2285-94.
41. Johnson C S, Kim J-S, Kropf A J, Kahaian A J, Vaughey J T, Thackeray M M. The role of Li2MO2 structures (M=metal ion) in the electrochemistry of (x)LiMn0.5Ni0.5O2(1−x)Li2TiO3 electrodes for lithium-ion batteries. Electrochem Comm. 2002; 4:492-8.
42. Park S H, Oh S W, Kang S G, Myung S-T, Sun Y-K. Effects of Molybdenum Doping on the Layered Li[Ni0.5+xMn0.5-2xMox]O2 Cathode Materials for Lithium Secondary Batteries. Chem Lett. 2004; 33(1):2.

43. Idemoto Y, Horiko K, Ito Y, Koura N, Ui K. Li content dependence of the thermodynamic stability, crystal structure and electrode performance of LixMn2-yMyO4 as a cathode active material for the lithium secondary battery. Electrochemistry. 2005; 72(11):755-62.
44. Yabuuchi N, Yamamoto K, Yoshii K, Nakai I, Nishizawa T, Omaru A, et al. Structural and Electrochemical Characterizations on Li2MnO3-LiCoO2-LiCrO2 System as Positive Electrode Materials for Rechargeable Lithium Batteries. J Electrochem Soc. 2013; 160(1):A39-A45.
45. Song B, Lai M O, Lu L. Influence of Ru substitution on Li-rich 0.55Li2MnO3 0.45LiNi⅓Co⅓Mn⅓O2 cathode for Li-ion batteries. Electrochim Acta. 2012; 80:187-95.
46. Wang C-C, Manthiram A. Influence of cationic substitutions on the first charge and reversible capacities of lithium-rich layered oxide cathodes. J Mater Chem A. 2013; 1:10209.
47. Yu H, Zhou H. Initial Coulombic efficiency improvement of the Li1.2Mn0.567Ni0.166Co0.067O2 lithium-rich material by ruthenium substitution for manganese. J Mater Chem. 2012; 22:15507.
48. Qiu B, Wang J, Xia Y, Liu Y, Qin L, Yao X, et al. Effects of Na+ contents on electrochemical properties of Li1.2Ni0.13Co0.13Mn0.54O2 cathode materials. J Power Sources. 2013; 240:530-5.
49. Tang Z, Li X, Wang Z. Effects of Al doping for Li[Li0.09Mn0.65*0.91Ni0.35*0.91]O2 cathode material. Ionics. 2013; 19:1495-501.
50. He W, Yuan D, Qian J, Ai X, Yang H, Cao Y. Enhanced high-rate capability and cycling stability of Na-stabilized layered Li1.2[Co0.13Ni0.13Mn0.54]O2 cathode material. J Mater Chem A. 2013; 1:11397.
51. Dong X, Xu Y, Xiong L, Sun X, Zhang Z. Sodium substitution for partial lithium to significantly enhance the cycling stability of Li2MnO3 cathode material. J Power Sources. 2013; 243:78-87.
52. Wang D, Belharouak I, Zhou G, Amine K. Synthesis of Lithium and Manganese-Rich Cathode Materials via an Oxalate Co-Precipitation Method. J Electrochem Soc. 2013; 160(5):A3108-A12.
53. Thackeray M M, Kang S-H, Johnson C S, Vaughey J T, Benedek R, Hackney S A. Li$_2$MnO$_3$-stabilized LiMO$_2$ (M=Mn, Ni, Co) electrodes for lithium-ion batteries. J Mater Chem. 2007; 17:3112-25.
54. West W C, Soler J, Ratnakumar B V. Preparation of high quality layered-layered composite Li2MnO3-LiMO2 (M=Ni, Mn, Co) Li-ion cathodes by a ball milling-annealing process. J Power Sources. 2012; 204:200-4.
55. Amalraj F, Kovacheva D, Talianker M, Zeiri L, Grinblat J, Leifer N, et al. Synthesis of Integrated Cathode Materials xLi$_2$MnO$_3$*(1−x)LiMn$_{1/3}$Ni$_{1/3}$Co$_{1/3}$O$_2$ (x=0.3, 0.5, 0.7) and Studies of Their Electrochemical Behavior. J Electrochem Soc. 2010; 157(10):A1121-A30.
56. Hong Y J, Kim J H, Kim M H, Kang Y C. Electrochemical properties of 0.3Li2MnO3.0.7LiNi0.5Mn0.5O2 composite cathode powders prepared by large-scale spray pyrolysis. Mat Res Bull. 2012; 47:2022-6.
57. Waser O, Büchel R, Hintennach A, Novak P, Pratsinis S E. Continuous flame aerosol synthesis of carbon-coated nano-LiFePO4 for Li-ion batteries. J Aerosol Sci. 2011; 42(10):657-67.
58. Axelbaum R L, Zhang X, inventors Spray Pyrolysis Synthesis of Mesoporous Positive Electrode Materials for High Energy Lithium-Ion Batteries 2012.
59. Widiyastuti W, Balgis R, Iskandar F, Okuyama K. Nanoparticle formation in spray pyrolysis under low-pressure conditions. Chem Eng Sci. 2010; 65(5):1846-54.
60. Lengyel M, Atlas G, Elhassid D, Luo P Y, Zhang X, Belharouak I, et al. Effects of synthesis conditions on the physical and electrochemical properties of Li1.2Mn0.54Ni0.13Co0.13O2 prepared by spray pyrolysis. J Power Sources. 2014, 262: 286-296.
61. Zhang X, Axelbaum R L. Spray Pyrolysis Synthesis of Mesoporous Lithium-Nickel-Manganese-Oxides for High Energy Li-Ion Batteries. J Electrochem Soc. 2012; 159 (6):A834-A42.
62. Shannon R D. Revised Effective Ionic Radii and Systematic Studies of Interatomie Distances in Halides and Chaleogenides. Acta Cryst. 1976; A 32:751.
63. Gao J, Huang Z, Li J, He X, Jiang C. Enhanced high-rate capability and cycling stability of Na-stabilized layered Li1.2[Co0.13Ni0.13Mn0.54]O2 cathode material. Ionics. 2013.
64. Kim S, Ma X, Ong S P, Ceder G. A comparison of destabilization mechanisms of the layered NaxMO2 and LixMO2 compounds upon alkali de-intercalation. Phys Chem Chem Phys. 2012; 14:15571-8.
65. Sun Y-K, Cho S-W, Lee S-W, Yoon C S, Amine K. AlF3-Coating To Improve High Voltage Cycling Performance of Li[Ni⅓Co⅓Mn⅓]O2 Cathode Materials for Lithium Seconday Batteries. J Electrochem Soc. 2007; 154(3):A168-A72.
66. West W C, Soler J, Smart M C, Ratnakumar B V, Firdosy S, Ravi V, et al. Electrochemical Behavior of Layered Solid Solution Li2MnO3-LiMO2 (M=Ni, Mn, Co) Li-Ion Cathodes with and without Alumina Coatings J Electrochem Soc. 2011; 158(8):A883-A9.
67. Amalraj F, Talianker M, Markovsky B, Burlaka L, Leifer N, Goobes G, et al. Studies of Li and Mn-Rich Lix [MnNiCo]O2 Electrodes: Electrochemical Performance, Structure, and the Effect of the Aluminum Fluoride Coating J Electrochem Soc. 2013; 160(11):A2220-A33.
68. Cabana J, Kang S-H, Johnson C S, Thackeray M M, Grey C P. Structural and Electrochemical Characterization of Composite Layered-Spinel Electrodes Containing Ni and Mn for Li-Ion Batteries. J Electrochem Soc. 2009; 156(9):A730-A6.
69. Pelosato R, Cristiani C, Dotelli G, Latorrata S, Ruffo R, Zampori L. Co-precipitation in aqueous medium of La0.8Sr0.2Ga0.8Mg0.2O3-δ via inorganic precursors. J Power Sources. 2010; 195:8116-23.
70. Chung W, Jung H, Lee C H, Kim S H. Characteristics of MgO-coated alkaline Earth selenide phosphor prepared by spray pyrolysis. Thin Solid Films. 2013; 546:98-103.
71. Conry T E, Mehta A, Cabana J, Doeff M M. Structural Underpinnings of the Enhanced Cycling Stability upon Al Substitution in LiNi0.45Mn0.45Co0.1-yAlyO2 Positive Electrode Materials for Li-ion Batteries. Chem Mater. 2012; 24:3307-17.
72. Conry T E, Mehta A, Cabana J, Doeff M M. XAFS Investigations of LiNi0.45Mn0.45Co0.1-yAlyO2 Positive Electrode Materials. J Electrochem Soc. 2012; 159 (9):A1562-A71.
73. Aurbach D, Levi M D, Levi E, Teller H, Markovsky B, Salitra G, et al. Common electroanalytical behavior of Li intercalation processes into graphite and transition metal oxides. J Electrochem Soc. 1998; 145(9):3024-34.
74. Levi M D, Salitra G, Markovsky B, Teller H, Aurbach D, Heider U, et al. Solid-state electrochemical kinetics of Li-ion intercalation into Li1-xCoO2: Simultaneous application of electroanalytical techniques SSCV, PITT, and EIS. J Electrochem Soc. 1999; 146(4):1279-89.
75. Zhuang Q C, Xu J M, Fan X Y, Dong Q F, Jiang Y X, Huang L, et al. An electrochemical impedance spectroscopic study of the electronic and ionic transport properties of LiCoO2 cathode. *Chinese Sci Bull.* 2007; 52(9): 1187-95.
76. Zhuang Q C, Wei T, Du L L, Cui Y L, Fang L, Sun S G. An Electrochemical Impedance Spectroscopic Study of the Electronic and Ionic Transport Properties of Spinel LiMn2O4. *J Phys Chem C.* 2010; 114(18):8614-21.
77. Mohanty D, Li J, Abraham D P, Huq A, Payzant E A, III D L W, et al. Unraveling the Voltage Fade Mechanism in High-Energy-Density Lithium ion Batteries: Origin of the Tetrahedral Cations for Spinel Conversion. *Chem Mater* 2014.
78. Zheng J, Gu M, Genc A, Xiao J, Xu P, Chen X, et al. Mitigating Voltage Fade in Cathode Materials by Improving the Atomic Level Uniformity of Elemental Distribution. *Nano Lett* 2014, 14: 2628-2635.

What is claimed is:

1. A layered composite composition having a general chemical formula of $Li_{\alpha-x}AD_x(Mn_{\beta-y-\varepsilon}Al_yNi_{\gamma-\varepsilon}Co_{\delta-z}AED_z)O_2$ wherein:
   AD is an alkaline dopant selected from the group consisting of Na, K, Rb, Cs, and combinations thereof;
   AED is an alkaline earth dopant selected from the group consisting of Mg, Ca, Sr, Ba, and combinations thereof;
   $1 \leq \alpha \leq 2$;
   $0 \leq x <$ an alkaline dopant threshold concentration at and above which an alkaline-containing spinel phase is formed in the composition;
   $\frac{1}{3} \leq \beta \leq 1$;
   $0 \leq y < 0.1$;
   $0.0 \leq \gamma \leq \frac{1}{3}$;
   $0.0 \leq \delta \leq \frac{1}{3}$;
   $0 \leq z$, $\varepsilon \leq$ an alkaline earth threshold concentration at and above which an alkaline earth-containing spinel phase is formed in the composition; and
   at least two of x, y, z, and $\varepsilon$ are $\geq 0.001$.

2. The layered composite composition of claim 1, wherein $x \leq 0.1$, $y \leq 0.1$, $z \leq 0.1$, and $\varepsilon \leq 0.1$.

3. The layered composite composition of claim 2, wherein $x \geq 0.001$, $y \geq 0.001$, $z \geq 0.001$, and $\varepsilon$ are $\geq 0.001$.

4. The layered composite composition of claim 1, wherein:
   $1.0 \leq \alpha \leq 1.5$;
   $0.005 \leq x \leq 0.035$;
   $\frac{1}{3} \leq \beta \leq \frac{2}{3}$;
   $0.005 \leq y \leq 0.035$;
   $0.10 \leq \delta \leq \frac{1}{3}$;
   $0.005 \leq z \leq 0.035$; and
   $0.005 \leq \varepsilon \leq 0.035$.

5. The layered composite composition of claim 1, wherein:
   $1.0 \leq \alpha \leq 1.5$;
   $0.010 \leq x \leq 0.030$;
   $\frac{1}{3} \leq \beta \leq \frac{2}{3}$,
   $0.010 \leq y \leq 0.030$;
   $0.10 \leq \delta \leq \frac{1}{3}$;
   $0.010 \leq z \leq 0.030$; and
   $0.010 \leq \varepsilon \leq 0.030$.

6. The layered composite composition of claim 1, wherein:
   AD is selected from the group consisting of Na, K, Rb, Cs, and combinations thereof; and
   AED is selected from the group consisting of Mg, Ca, Sr, Ba, and combinations thereof.

7. A metal oxide material comprising a plurality of mesoporous metal oxide secondary particles that comprise metal oxide primary particles, wherein the primary particles have a size that is in a range of about 1 nm to about 10 μm and the secondary particles have a size that is in a range of about 10 nm to about 100 μm, and wherein the metal oxide is the layered composite composition of claim 1.

8. The metal oxide material of claim 7, wherein the secondary particles have a sphericity of at least about 0.95, an inter-primary particle spacing that is in a range of about 2 nm to about 100 nm, and a Brunnauer-Emmett-Teller surface area that is in the range of about 1 $m^2$/g to about 30 $m^2$/g.

9. The metal oxide material of claim 7, wherein the relative concentration of each element within any 1 micrometer region of the material does not vary more than about 4% from the mean and that the standard deviation throughout the material is no greater than about 4%.

10. The metal oxide material of claim 7, wherein the primary particles have a mean size that is in the range of about 1 nm to about 500 nm and the secondary particles have a mean size that is in the range of about 0.1 μm to about 20 μm and the standard deviation with respect to the mean size for the secondary particles is in the range about 0 to about 10.

11. The metal oxide material of claim 7, wherein the primary particles have a mean size that is in the range of about 500 nm to about 10 μm and the secondary particles have a mean size that is in the range of about 1 μm to about 100 μm and the standard deviation with respect to the mean size for the secondary particles is in the range about 0 to about 10.

12. A process for preparing the metal oxide material of claim 7, the process comprising aerosolizing a precursor solution that comprises compounds that are precursors to the metal oxide in a solvent to form droplets that comprise the precursor solution; evaporating the solution in the droplets to form dried droplets that comprise the precursor compounds; calcining the dried droplets to form the metal oxide material that comprises a plurality of metal oxide secondary particles that comprise metal oxide primary particles.

13. The process of claim 12, wherein the precursor solution has a concentration of precursor compounds that is up to about 10 mole/L.

14. The process of claim 12, wherein the precursor compounds comprise nitrates of the metallic elements of the metal oxide.

15. The process of claim 12, wherein the droplets are of a size that is in the range of about 0.1 μm to about 1000 μm.

16. The process of claim 12 further comprising annealing the metal oxide material to cause crystallite growth and coarsening in the metal oxide material and affect the crystal structure of the metal oxide material, wherein the primary particles of the annealed metal oxide material have a size that is in the range of about 1 nm to about 10 μm and the secondary particles of the annealed metal oxide material have a size that is in the range of about 10 nm to about 100 μm and are mesoporous.

17. The process of claim 16, wherein the metal oxide material is annealed at a temperature within a range of about 300 to about 1000° C. for a duration that is within a range of about 30 minutes to about 48 hours.

18. The process of claim 16 further comprising cooling the annealed metal oxide material at a rate sufficiently slow so as to inhibit formation of defects in the metal oxide.

19. A metal oxide-containing material comprising a plurality of mesoporous, metal oxide-containing secondary particles with a non-hollow morphology and a mean size that is in a range of about 1 μm to about 15 μm, wherein the secondary particles comprise primary particles with a mean size that is in a range of about 50 nm to about 500 nm, and wherein the metal oxide is the layered composite composition of claim 1.

20. The metal oxide-containing material of claim 19, wherein the mean size of the secondary particles in a range of about 4 μm to about 10 μm, and the standard deviation with respect to the mean size for the secondary particles is in the range about 0 to about 10.

21. The metal oxide-containing material of claim 19, wherein the secondary particles have an inter-primary particle spacing that is in the range of about 2 nm to about 100 nm.

22. The metal oxide-containing material of claim 19, wherein the secondary particles have a Brunnauer-Emmett-Teller surface area that is in the range of about 1 $m^2/g$ to about 100 $m^2/g$.

23. The metal oxide-containing material of claim 19, wherein the relative concentration of each element within any 1 micrometer region of the material does vary more than about 1% from the mean and the standard deviation throughout the material is no greater than about 1%.

24. A process for preparing the metal oxide-containing material of claim 19, the process comprising conducting spray pyrolysis that comprises:
   a. aerosolizing a slurry that comprises solid-phase particles in a precursor solution to form droplets that comprise the precursor solution and one or more of the solid-phase particles, wherein (i) the solid-phase particles have a mean size that is in a range of about 10 nm and 50 μm, and (ii) the precursor solution comprises precursor compounds to the metal oxide that are dissolved in a solvent, and (iii) the slurry has a total mass fraction of solid-phase particles to metal oxide-containing material that is in a range of about 2% to about 75%;
   b. evaporating the solvent in the droplets to form dried droplets that comprise the precursor compounds and one or more solid-phase particles; and
   c. calcining the dried droplets to at least partially decompose the precursor compounds and form the metal oxide-containing material, wherein the metal oxide-containing material comprises product particles that comprise the metal oxide, wherein the product particles have (i) a mean size that is in a range of about 100 nm to about 500 μm and (ii) a mean hollowness, which is less than a mean hollowness of particles of about the same mean size prepared by an otherwise identical spray pyrolysis process conducted except for the absence of seed particles in the aerosol.

25. The process of claim 24, wherein the mean size of the solid-phase particles is in the range of about 100 nm to about 15 μm, and the mean size of the product particles is in the range of about 500 nm to about 50 μm.

26. The process of claim 24, wherein the mean hollowness of the product particles is less than about 60%.

27. The process of claim 24, wherein the mean hollowness of the product particles is less than about 20%.

28. The process of claim 24, wherein the solid-phase particles are selected from the group consisting of (i) decomposing solid-phase particles that have a composition that decomposes during the calcining, (ii) stable solid-phase particles that have a composition that does not substantially decompose during the calcining solid-phase particles, (iii) partially stable solid-phase particles that have a composition that comprises at least one compound that decomposes during the calcining and at least one different compound that does not substantially decompose during the calcining, and (iv) combinations thereof.

29. The process of claim 24, wherein the calcining is conducted at a temperature that does not exceed the melting point of the metal oxide.

30. The process of claim 24, wherein the solid-phase particles were produced by spray pyrolysis.

31. The process of claim 30, wherein the solid-phase particles were ground after being produced by spray pyrolysis to alter the size distribution of the solid-phase particles.

32. The process of claim 24, wherein the solid-phase particles have a non-hollow morphology.

33. The process of claim 24, wherein the product particles further have a porous morphology.

34. The process of claim 24 further comprising annealing the product particles to further decompose the precursor compounds, cause crystallite growth, or both.

35. The process of claim 34 further comprising cooling the annealed product particles at a rate sufficiently slow so as to inhibit formation of defects in the metal oxide.

36. The process of claim 24, wherein substantially all of the product particles have a substantially uniform composition.

37. The process of claim 24, wherein substantially all of the product particles have a non-uniform composition, wherein the solid-phase particle portion(s) thereof are of a different composition than that of the metal oxide portion thereof.

* * * * *